United States Patent
Suzuki et al.

(10) Patent No.: US 11,095,429 B2
(45) Date of Patent: Aug. 17, 2021

(54) CIRCUIT CONCEALING APPARATUS, CALCULATION APPARATUS, AND PROGRAM

(71) Applicant: NIPPON TELEGRAPH AND TELEPHONE CORPORATION, Chiyoda-ku (JP)

(72) Inventors: Koutarou Suzuki, Musashino (JP); Ryo Kikuchi, Musashino (JP); Carmen Kempka, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 163 days.

(21) Appl. No.: 16/348,417

(22) PCT Filed: Nov. 9, 2017

(86) PCT No.: PCT/JP2017/040450
§ 371 (c)(1),
(2) Date: May 8, 2019

(87) PCT Pub. No.: WO2018/088481
PCT Pub. Date: May 17, 2018

(65) Prior Publication Data
US 2020/0228310 A1 Jul. 16, 2020

(30) Foreign Application Priority Data
Nov. 11, 2016 (JP) .............................. JP2016-220784

(51) Int. Cl.
*H04L 9/06* (2006.01)
*G06F 21/72* (2013.01)
*H04L 9/34* (2006.01)

(52) U.S. Cl.
CPC ................ *H04L 9/06* (2013.01); *G06F 21/72* (2013.01); *H04L 9/34* (2013.01); *H04L 2209/12* (2013.01)

(58) Field of Classification Search
CPC .............. H04L 9/06; H04L 9/34; G06F 21/72
(Continued)

(56) References Cited

U.S. PATENT DOCUMENTS

| 2009/0175443 A1* | 7/2009 | Kolesnikov | H04L 9/06 380/44 |
| 2010/0211787 A1* | 8/2010 | Bukshpun | H04L 9/065 713/170 |
| 2017/0048208 A1* | 2/2017 | Raykova | H04L 9/0861 |

OTHER PUBLICATIONS

S. Zahur, M. Rosulek, and D. Evans. Two halves make a whole: Reducing data transfer in garbled circuits using half gates. In EUROCRYPT, 2015 (Year: 2015).*
(Continued)

*Primary Examiner* — Kambiz Zand
*Assistant Examiner* — Phuc Pham
(74) *Attorney, Agent, or Firm* — Oblon, McClelland, Maier & Neustadt, L.L.P.

(57) ABSTRACT

At least any one of input keys $K_A^0$, $K_A^1$, $K_B^0$, and $K_B^1$ is set so that the input keys $K_A^0$, $K_A^1$, $K_B^0$, and $K_B^1$ which satisfy $K_A^1 - K_A^0 = K_B^1 - K_B^0 = d_i$ are obtained, and an output key $K_i^{g_i(I(A), I(B))}$ corresponding to an output value $g_i(I(A), I(B))$ is set by using the input keys $K_A^0$, $K_A^1$, $K_B^0$, and $K_B^1$, where input values of a gate that performs a logical operation are $I(A), I(B) \in \{0, 1\}$, an output value of the gate is $g_i(I(A), I(B)) \in \{0, 1\}$, an input key corresponding to the input value $I(A)$ is $K_A^{I(A)}$, and an input key corresponding to the input value $I(B)$ is $K_B^{I(B)}$.

32 Claims, 20 Drawing Sheets

(58) Field of Classification Search
USPC .......................................................... 380/277
See application file for complete search history.

(56) References Cited

OTHER PUBLICATIONS

International Search Report dated Feb. 13, 2018 in PCT/JP2017/040450 filed on Nov. 9, 2017.
Kempka, C. et al., "How to Circumvent the Two-Ciphertext Lower Bound for Linear Garbling Schemes", Cryptology ePrint Archive: Report 2017/072, 2017, 31 pages.
Pinkas, B. et al., "Secure Two-Party Computation Is Practical", ASIACRYPT 2009, International Association for Cryptologic Research 2009, pp. 250-267.
Yao, A. C-C. et al., "How to Generate and Exchange Secrets", IEEE Press, 1986, pp. 162-167.

* cited by examiner

US 11,095,429 B2

CIRCUIT CONCEALING APPARATUS, CALCULATION APPARATUS, AND PROGRAM

TECHNICAL FIELD

The present invention relates to applied technology of an information security technology and, in particular, relates to a computation technology using a concealed circuit.

BACKGROUND ART

In Non-patent Literatures 1 and 2, the existing technologies of a computation system using a concealed circuit are disclosed.

PRIOR ART LITERATURE

Non-Patent Literature

Non-patent Literature 1: Benny Pinkas, Thomas Schneider, Nigel P. Smart, Stephen C. Williams, "Secure Two-Party Computation Is Practical," ASIACRYPT 2009, 250-267.
Non-patent Literature 2: A. C. Yao, "How to generate and exchange secrets," Proc. of FOCS'86, pp. 162-167, IEEE Press, 1986.

SUMMARY OF THE INVENTION

Problems to be Solved by the Invention

However, in the systems described in Non-patent Literatures 1 and 2, there is room to reduce the amount of data of a concealed circuit.

An object of the present invention is to reduce the amount of data of a concealed circuit.

Means to Solve the Problems

At least any one of input keys $K_A^0$, $K_A^1$, $K_B^0$, and $K_{B'}^1$ is set so that the input keys $K_A^0$, $K_A^1$, $K_{B'}^0$, and $K_{B'}^1$ which satisfy $K_A^1 - K_A^0 - K_{B'}^1 - K_{B'}^0 = d_i$ are obtained, and an output key $K_i^{g_i(I(A), I(B))}$ corresponding to an output value $g_i(I(A), I(B))$ is set by using the input keys $K_A^0$, $K_A^1$, $K_{B'}^0$, and $K_{B'}^1$. It is to be noted that input values of a gate that performs a logical operation are $I(A), I(B) \in \{0, 1\}$, an output value of the gate is $g_i(I(A), I(B)) \in \{0, 1\}$, an input key corresponding to the input value $I(A)$ is $K_A^{I(A)}$, and an input key corresponding to the input value $I(B)$ is $K_{B'}^{I(B)}$.

Effects of the Invention

By making a difference between $K_A^1$ and $K_A^0$ and a difference between $K_{B'}^1$ and $K_{B'}^0$ equal to each other, it is possible to reduce the amount of data of a concealed circuit.

DETAILED DESCRIPTION OF THE EMBODIMENTS

First Embodiment

A first embodiment will be described by using the drawings.

<Configuration>

Figure 1:
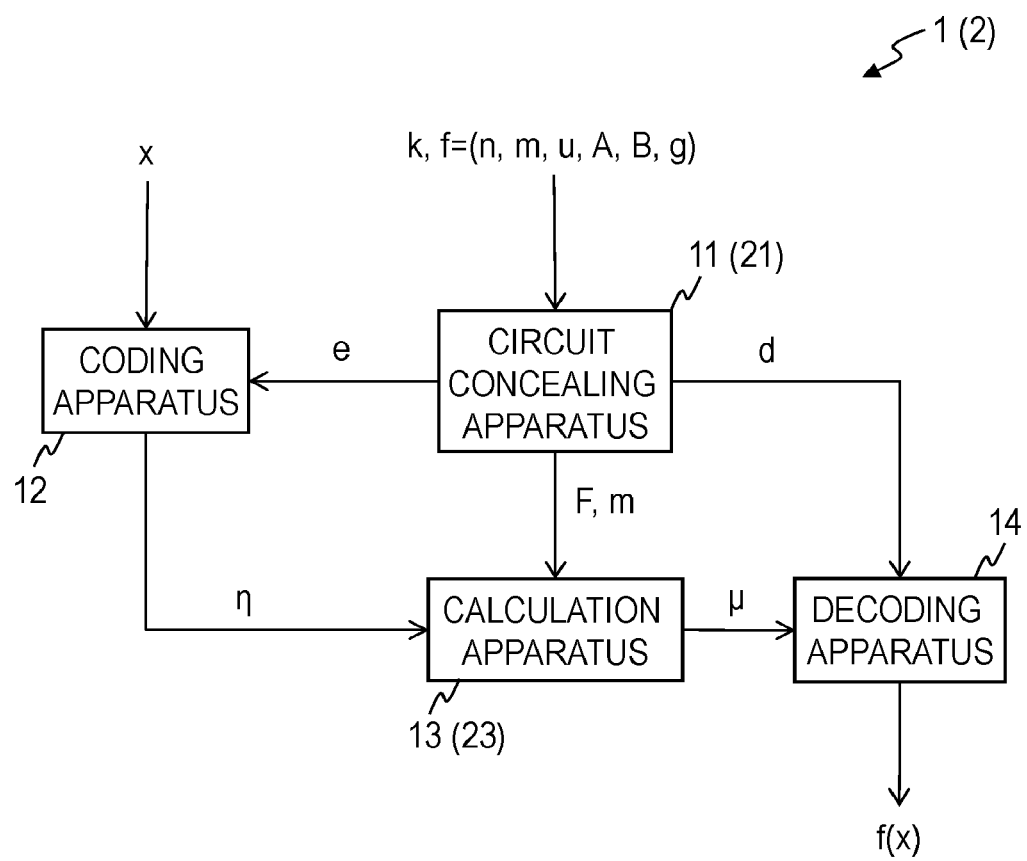
FIG. 1 is a block diagram illustrating the functional configuration of a secure computation system of an embodiment.

As illustrated in FIG. 1, a secure computation system 1 of the present embodiment includes a circuit concealing apparatus 11, a coding apparatus 12, a calculation apparatus 13, and a decoding apparatus 14. The circuit concealing apparatus 11 is configured so as to be capable of providing information to the coding apparatus 12, the calculation apparatus 13, and the decoding apparatus 14. The coding apparatus 12 is configured so as to be capable of providing information to the calculation apparatus 13. The calculation apparatus 13 is configured so as to be capable of providing information to the decoding apparatus 14. For example, the circuit concealing apparatus 11, the coding apparatus 12, the calculation apparatus 13, and the decoding apparatus 14 transmit and receive information via a network. The circuit concealing apparatus 11 and the coding apparatus 12 are used by different parties. The calculation apparatus 13 and the decoding apparatus 14 may be used by any party. For the sake of simplification of explanations, in FIG. 1, one circuit concealing apparatus 11, one coding apparatus 12, one calculation apparatus 13, and one decoding apparatus 14 are depicted; however, as for at least any one of these apparatuses, more than one apparatus may be present.

<Circuit Concealing Apparatus 11>

Figure 2:
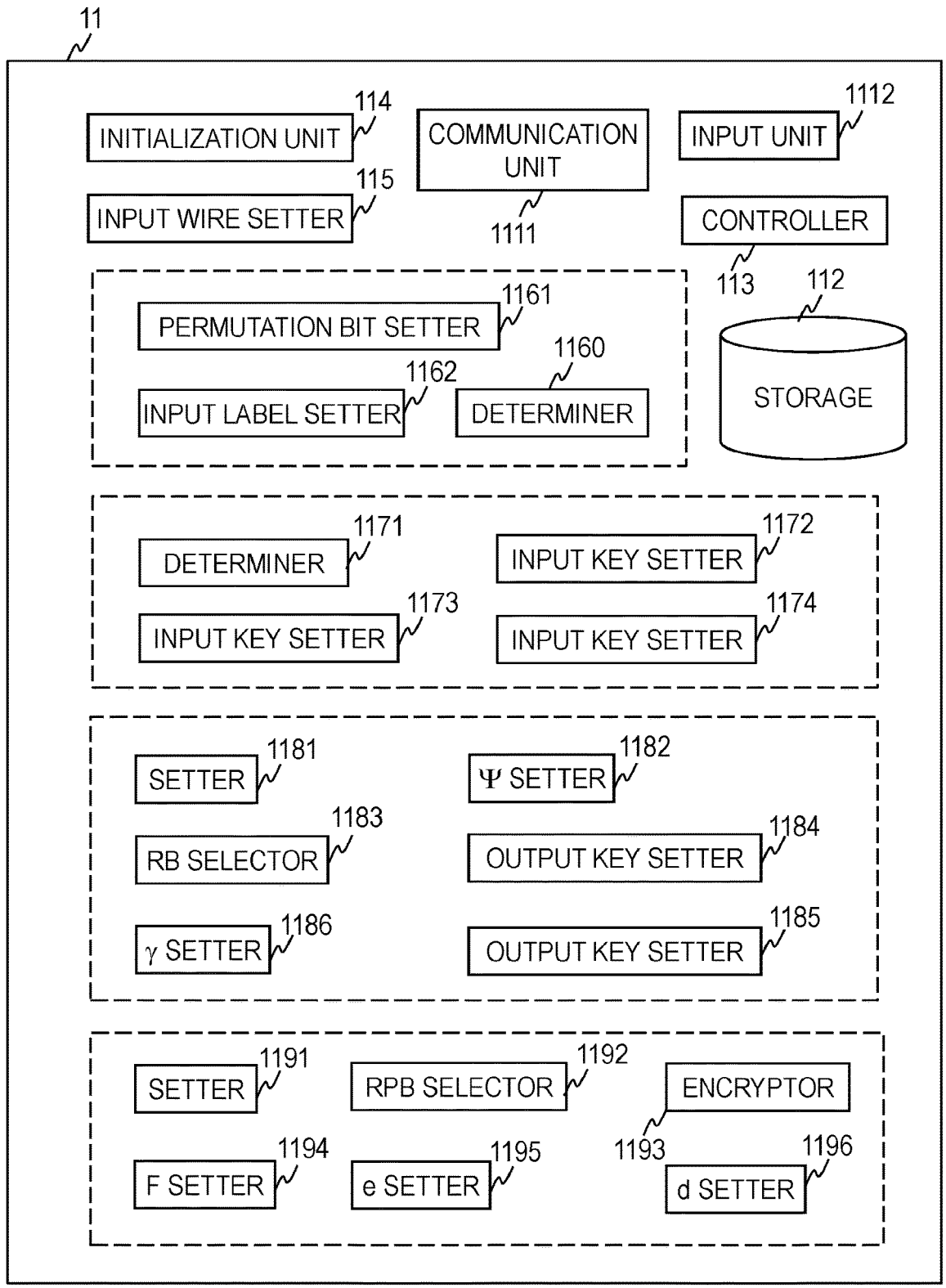
FIG. 2 is a block diagram illustrating the functional configuration of a circuit concealing apparatus of the embodiment.
Figure 3A:
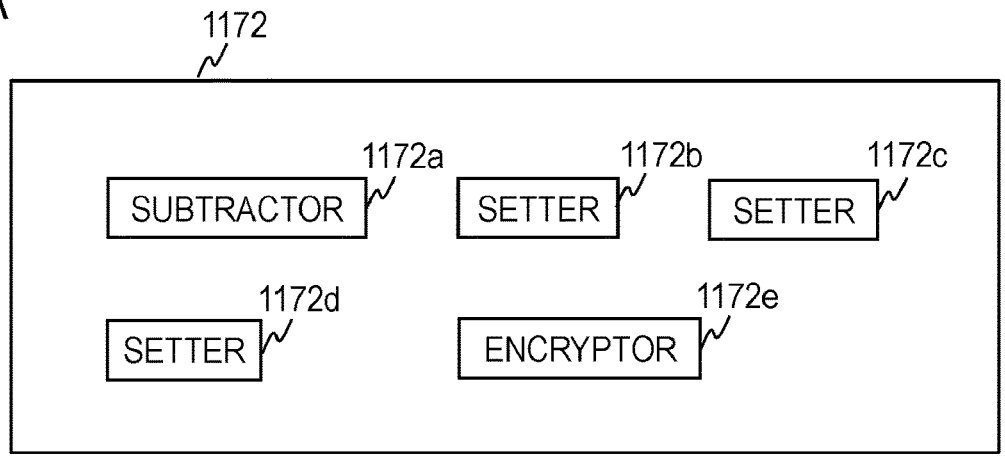
FIGS. 3A to 3C are block diagrams illustrating the functional configurations of input key setters.
Figure 3B:
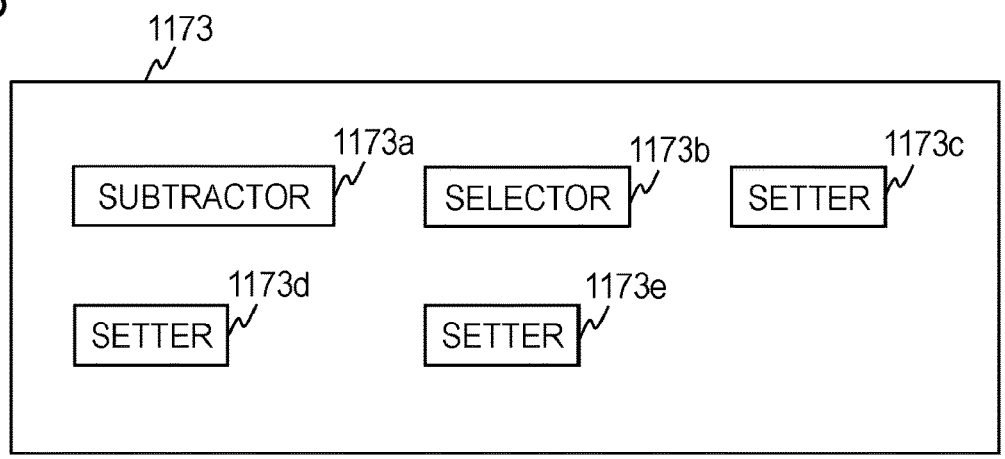
Figure 3C:
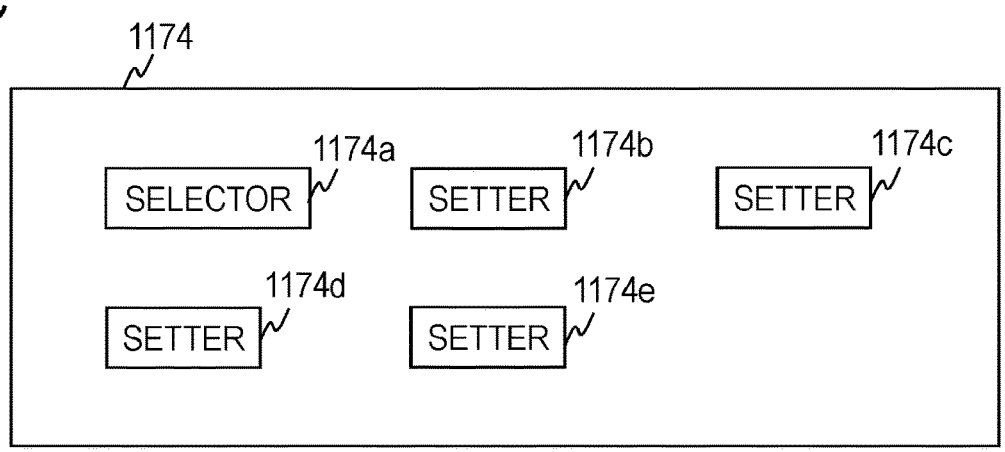

As illustrated in FIG. 2, the circuit concealing apparatus 11 includes a communication unit 1111, an input unit 1112, a storage 112, a controller 113, an initialization unit 114, an input wire setter 115, a determiner 1160, a permutation bit setter 1161, an input label setter 1162, a determiner 1171, input key setters 1172 to 1174, a setter 1181, a Ψ setter 1182, an RB selector 1183, an output key setter 1184, an output key setter 1185, a γ setter 1186, a setter 1191, an RPB selector 1192, an encryptor 1193, an F setter 1194, an e setter 1195, and a d setter 1196. As illustrated in FIG. 3A, the input key setter 1172 includes a subtractor 1172a, setters 1172b to 1172d, and an encryptor 1172e. As illustrated in FIG. 3B, the input key setter 1173 includes a subtractor 1173a, a selector 1173b, and setters 1173c to 1173e. As illustrated in FIG. 3C, the input key setter 1174 includes a selector 1174a and setters 1174b to 1174e.

<Coding Apparatus 12>

Figure 4A:
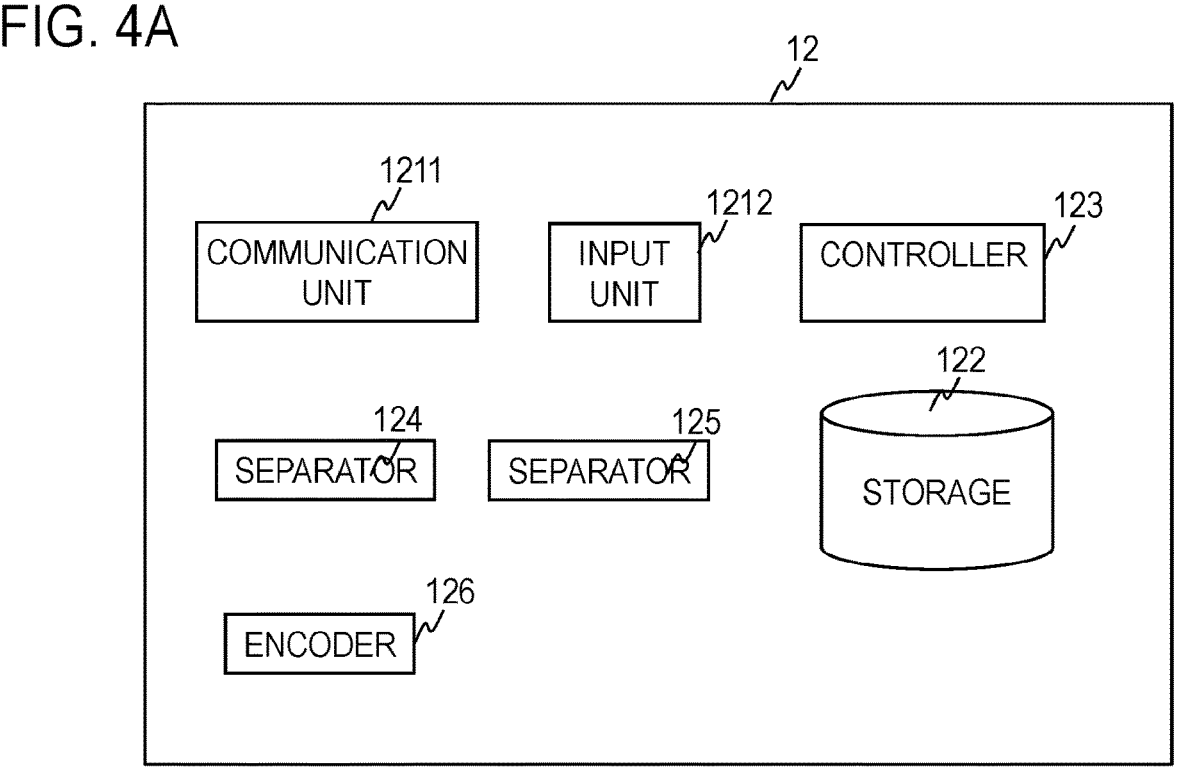
FIG. 4A is a block diagram illustrating the functional configuration of a coding apparatus of the embodiment.

As illustrated in FIG. 4A, the coding apparatus 12 includes a communication unit 1211, an input unit 1212, a storage 122, a controller 123, separators 124 and 125, and an encoder 126.

<Calculation Apparatus 13>

Figure 5:
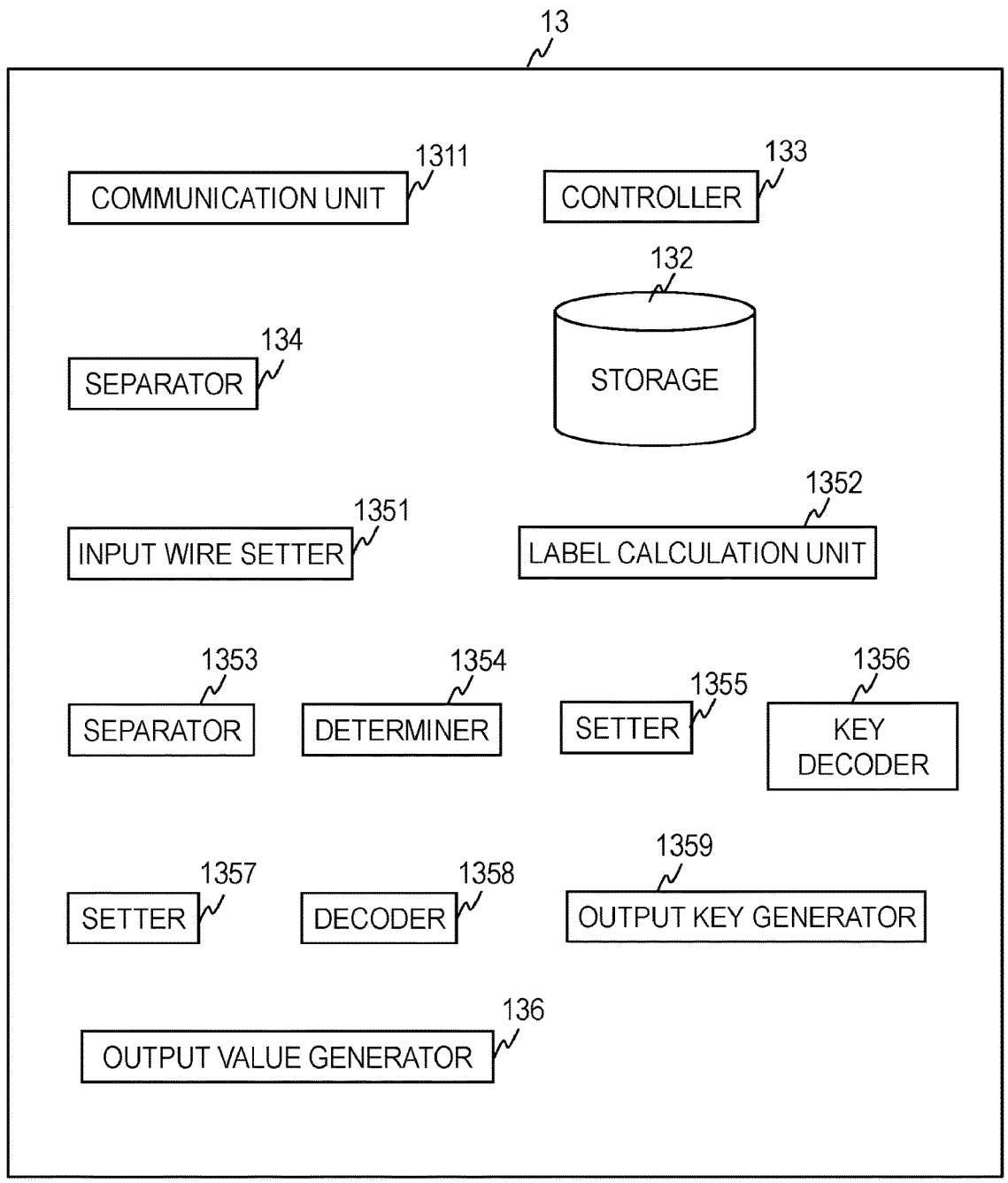
FIG. 5 is a block diagram illustrating the functional configuration of a calculation apparatus of the embodiment.
Figure 6:
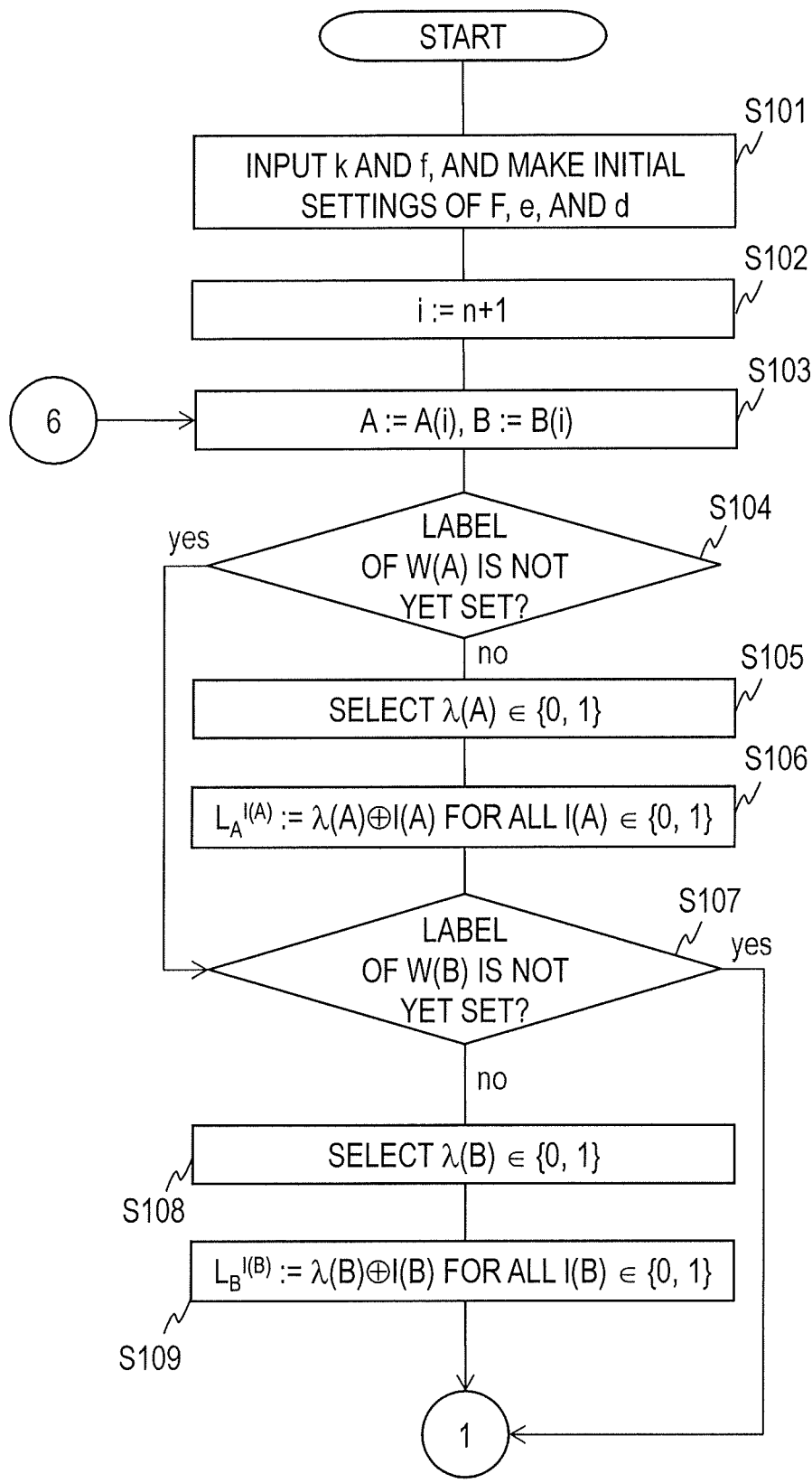
FIG. 6 is a flowchart for explaining circuit concealment processing of the embodiment.
Figure 7:
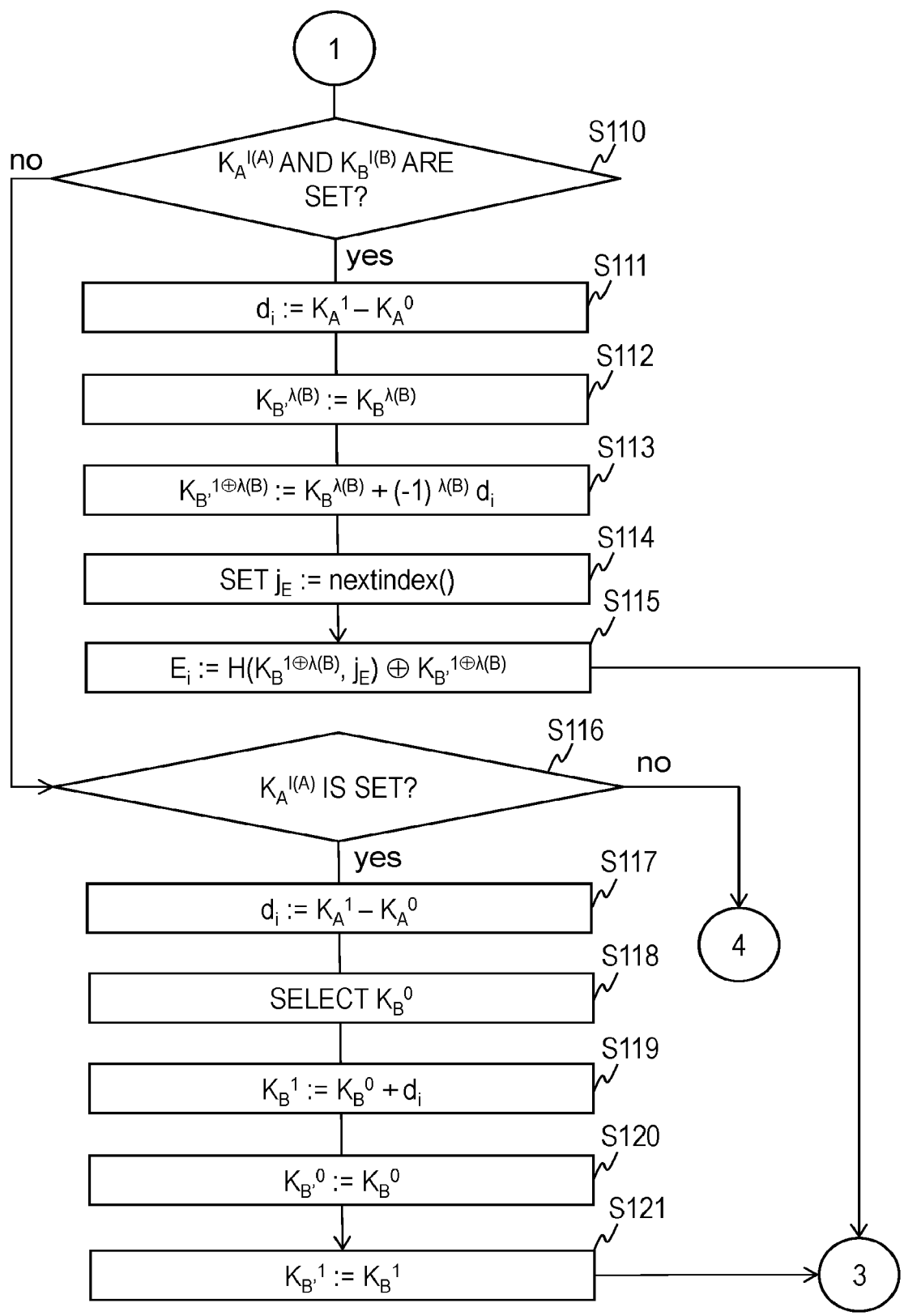
FIG. 7 is a flowchart for explaining the circuit concealment processing of the embodiment.
Figure 8:
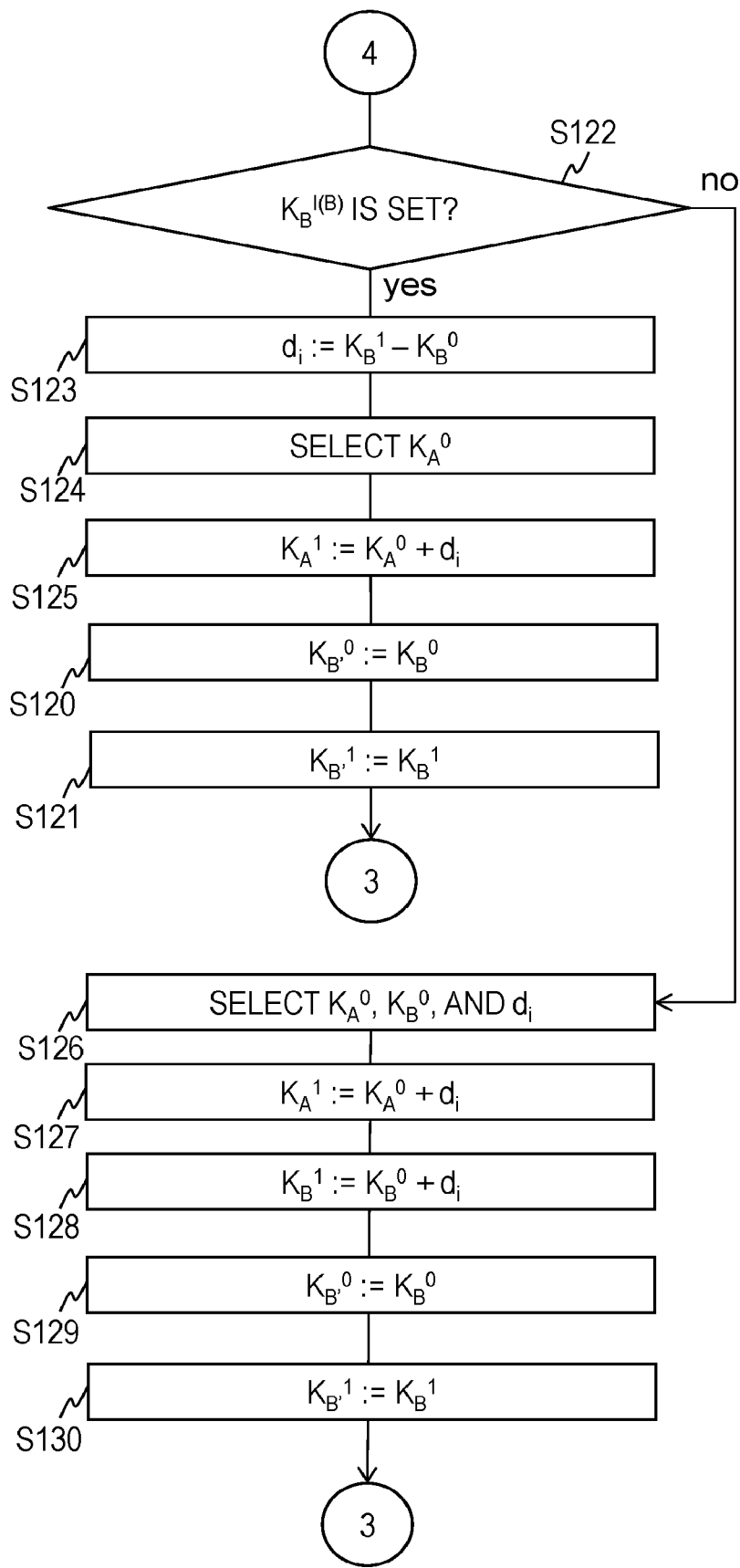
FIG. 8 is a flowchart for explaining the circuit concealment processing of the embodiment.
Figure 9:
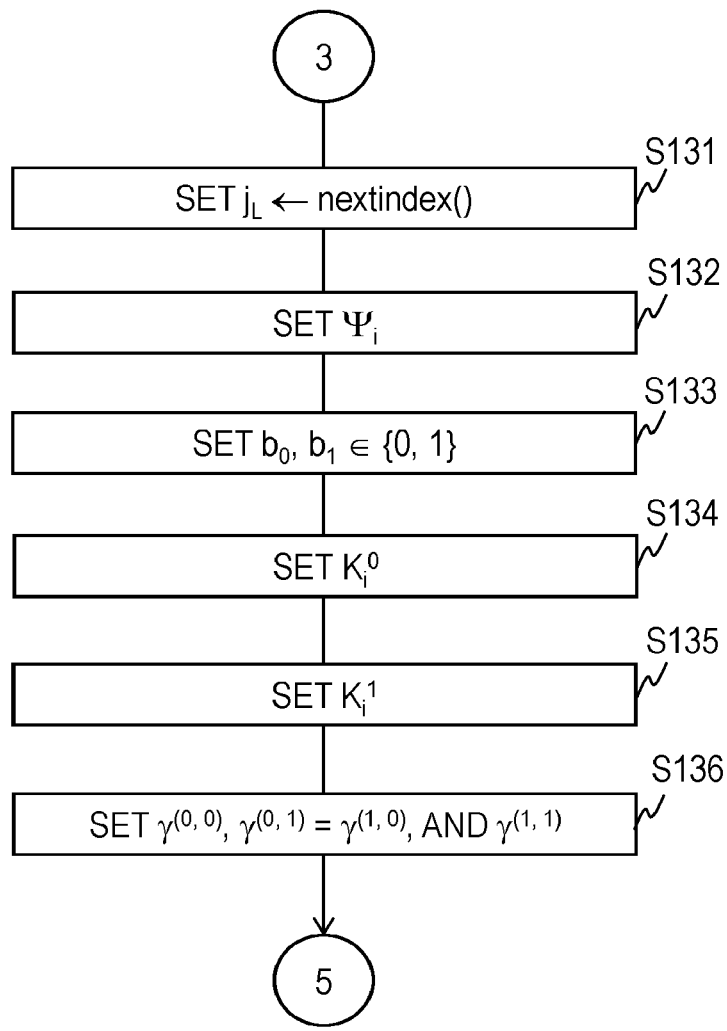
FIG. 9 is a flowchart for explaining the circuit concealment processing of the embodiment.
Figure 10:
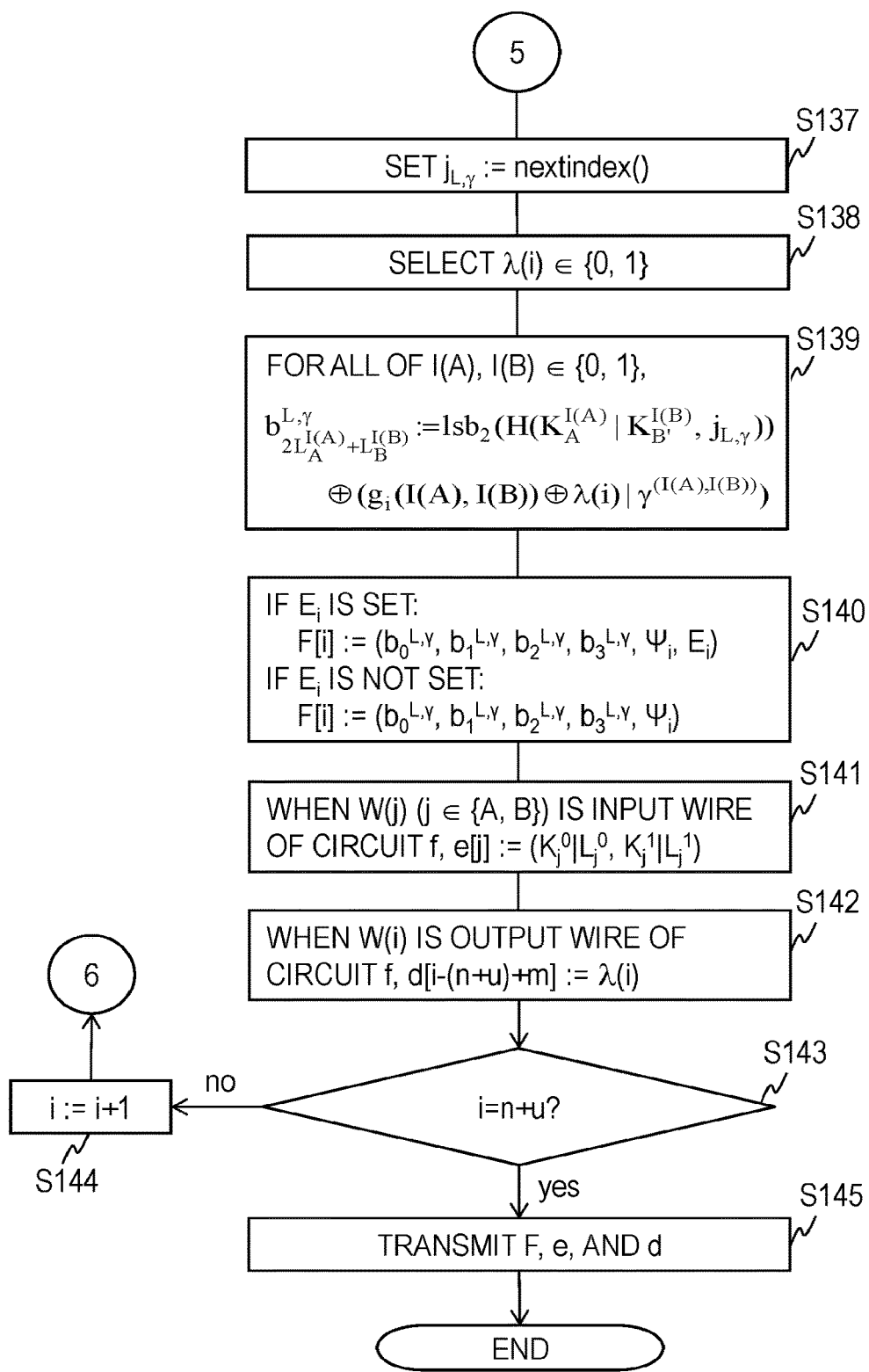
FIG. 10 is a flowchart for explaining the circuit concealment processing of the embodiment.

As illustrated in FIG. 5, the calculation apparatus 13 includes a communication unit 1311, a storage 132, a controller 133, a separator 134, an input wire setter 1351, a label calculation unit 1352, a separator 1353, a determiner 1354, a setter 1355, a key decoder 1356, a setter 1357, a decoder 1358, an output key generator 1359, and an output value generator 136.

<Decoding Apparatus 14>

Figure 4B:
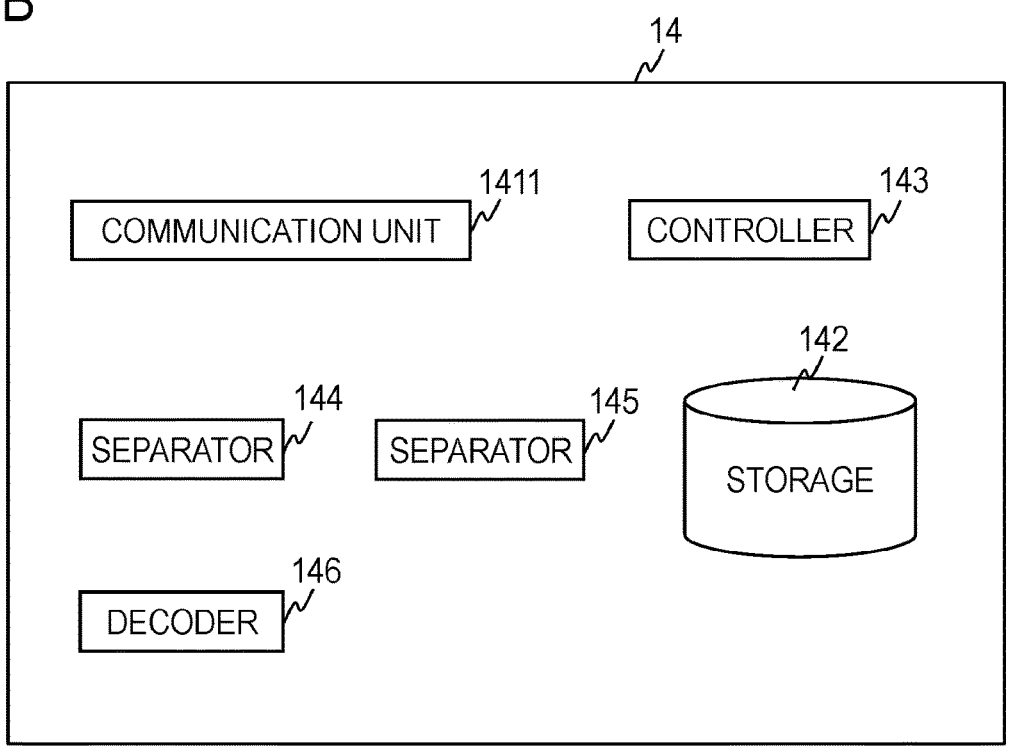
FIG. 4B is a block diagram illustrating the functional configuration of a decoding apparatus of the embodiment.

As illustrated in FIG. 4B, the decoding apparatus 14 includes a communication unit 1411, a storage 142, a controller 143, separators 144 and 145, and a decoder 146.

Each of the circuit concealing apparatus 11, the coding apparatus 12, the calculation apparatus 13, and the decoding apparatus 14 is an apparatus configured as a result of, for example, a general-purpose or dedicated computer including a communication apparatus, a processor (a hardware processor) such as a central processing unit (CPU), memory such as random-access memory (RAM) and read-only memory (ROM), and so forth executing a predetermined program. This computer may include one processor or memory or more than one processor or memory. This program may be installed in the computer or may be recorded on the ROM or the like in advance. Moreover, part or all of the processing units may be configured by using not an electronic circuit (circuitry), like a CPU, which implements a functional configuration as a result of a program being read thereinto but an electronic circuit that implements a processing function without using a program. Furthermore, an electronic circuit with which one apparatus is configured may include a plurality of CPUs. The circuit concealing apparatus 11, the coding apparatus 12, the calculation apparatus 13, and the decoding apparatus 14 perform processing under control of the controllers 113, 123, 133, and 143, respectively. Information input to the circuit concealing apparatus 11, the coding apparatus 12, the calculation apparatus 13, and the decoding apparatus 14 and data obtained in these apparatuses are stored respectively in the storages 112, 122, 132, and 142 one by one and used by being read therefrom when necessary.

<Illustration of a Circuit f to be Concealed=(n, m, u, A, B, g)>

A circuit f to be concealed is mapping (a function) that outputs an m-bit output value $W \in \{0, 1\}^m$ for an n-bit input value $Z \in \{0, 1\}^n$ (f: $\{0, 1\}^n \to \{0, 1\}^m$). Here, n is an even number greater than or equal to 2 and n may be equal to 4 or may be greater than or equal to 6. m is an integer greater than or equal to 1, and m may be equal to 1 or may be greater than or equal to 2. For instance, m may be smaller than n. $\{0, 1\}^n$ represents a set of n members of 0 or 1. That is, $\{0, 1\}^n$ represents a set of n-bit binary values.

Figure 14A:
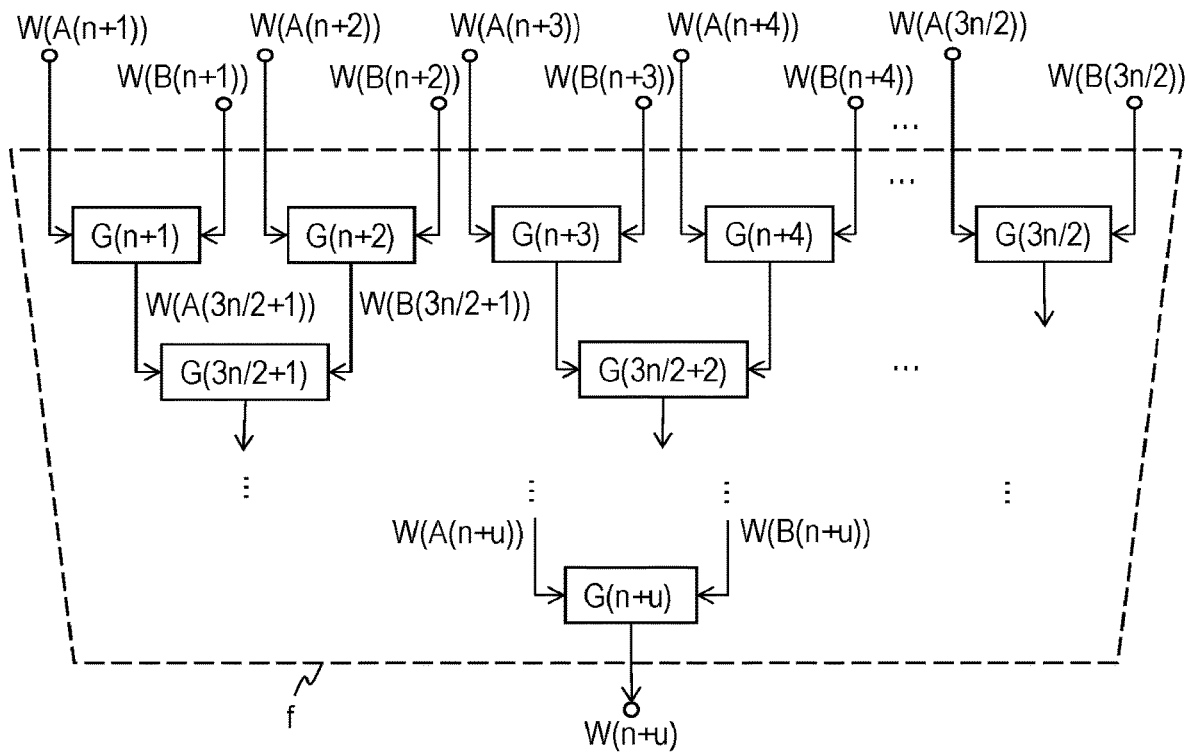
FIGS. 14A and 14B are conceptual diagrams illustrating a circuit to be concealed.
Figure 14B:
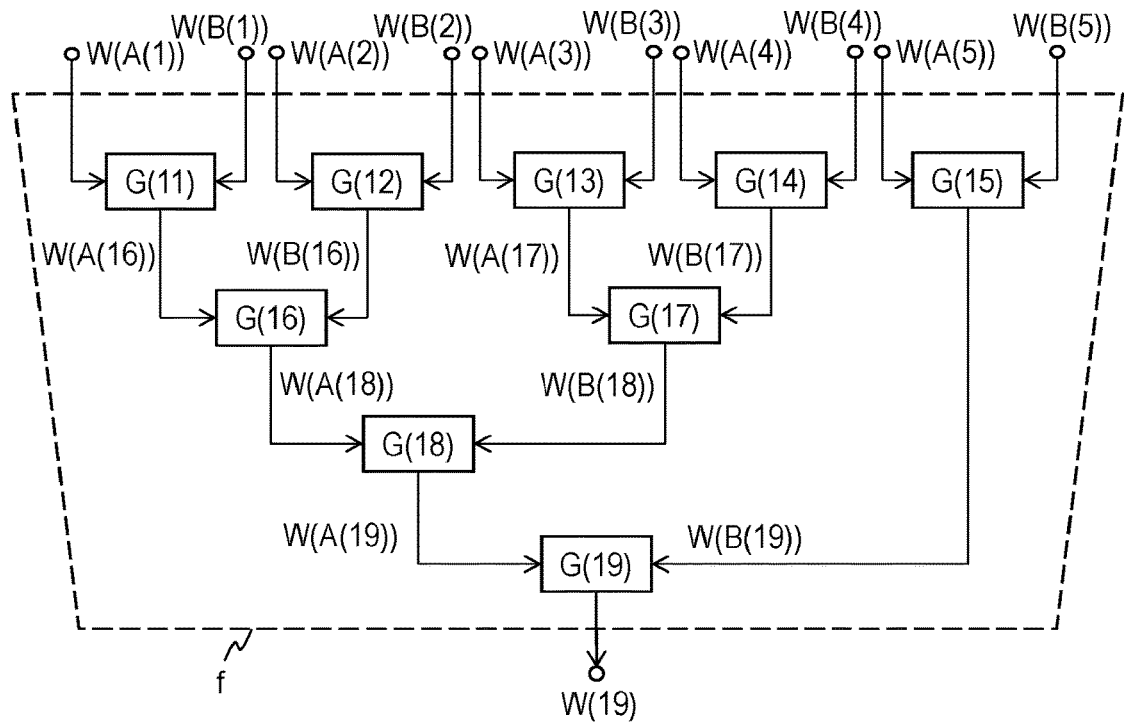

As illustrated in FIGS. 14A and 14B, the circuit f is configured with u gates G(n+1), . . . , G(n+u). u is an integer greater than or equal to 1. For example, u may be greater than or equal to 2 or may be greater than or equal to 3. FIG. 14B is an example of a case where n=10, u=9, and m=1. A gate G(i) (where $i \in \{n+1, \ldots, n+u\}$) is a 2-input 1-output logical gate (G(i): $\{0, 1\} \times \{0, 1\} \to \{0, 1\}$). A set of gates G(n+1), . . . , G(n+u) is written as $G_{set}:=\{G(n+1), \ldots, G(n+u)\}$. A set of gates G(n+1), . . . , G(3n/2) on an input side to which the n-bit input value $Z \in \{0, 1\}^n$ is input is written as $G_{input}:=\{G(n+1), \ldots, G(3n/2)\}$. It is to be noted that "α:=β" means that α is set as β. Examples of the gate include an AND gate, an OR gate, and an XOR gate.

An input variable to the gate G(i) is referred to as an input wire and an output variable is referred to as an output wire. Each gate G(i) has two input wires and one output wire. The input wires and the output wire are generically referred to as wires. The input wires of the gate G(i) are written as W(A(i)) and W(B(i)) and the output wire is written as W(i). A set of wires of the gates G(n+1), . . . , G(n+u) is written as $W_{set}:=\{W(1), \ldots, W(n+u)\}$. It is to be noted that A(i)<B(i)<i and A(n+1)=1, B(n+1)=2, . . . , A(3n/2)=n−1, B(3n/2)=n, . . . , and A(n+u)=n+u−2, B(n+u)=n+u−1. A set of input wires W(A(n+1))=W(1), W(B(n+1))=W(2), . . . , W(A(3n/2))=W(n−1), W(B(3n/2))=W(n) of n/2 gates G(n+1), . . . , G(3n/2) belonging to the set $G_{input}$ is written as $W_{input}:=\{W(1), \ldots, W(n)\}$. A set of output wires W(n+u−m+1), . . . , W(n+u) of the gate G(n+u) is written as $W_{output}:=\{W(n+u-m+1), \ldots, W(n+u)\}$. The output wires W(n+u−m+1), . . . , W(n+u) indicate the computation results.

The input wires W(1), . . . , W(n) of the gates belonging to the set $G_{input}$ are the input wires of the circuit f and correspond to the n-bit input value Z. An output wire W(v) of a gate G(v) (where $v \in \{n+1, \ldots, n+u-1\}$) is an input wire W(A(ω)) or W(B(ω)) of any gate $G(\omega) \in {}_cG_{set}$. It is to be noted that ${}_cG_{set}$ represents a complementary set of a set $\{G(n+1), \ldots, G(n+u-1)\}$ in the set $G_{set}$. That is, ${}_cG_{set}$ represents a set obtained by removing an element belonging to the set $\{G(n+1), \ldots, G(n+u-1)\}$ from the set $G_{set}$. v<ω holds. Different output wires are not the same input wire and a single output wire is not a plurality of input wires. The output wires W(n+u−m+1), . . . , W(n+u) of the gates G(n+u−m+1), . . . , G(n+u) are the output wires of the circuit f and correspond to bits of the output value W.

An output value $g_i(I(A(i)), I(B(i))) \in \{0, 1\}$ of the output wire W(i) is determined in accordance with the type of the gate G(i) (where $i \in \{n+1, \ldots, n+u\}$) and input values $I(A(i)), I(B(i)) \in \{0, 1\}$ of the input wires W(A(i)) and W(B(i)). That is, the logical operation result in the gate G(i) obtained for I(A(i)) and I(B(i)) is $g_i(I(A(i)), I(B(i)))$. For instance, when the gate G(i) is an AND gate, an OR gate, or an XOR gate, the relationship among I(A(i)), I(B(i)), and $g_i(I(A(i)), I(B(i)))$ is as follows.

<<AND Gate>>

TABLE 1

| I(A(i)) | I(B(i)) | $g_i(I(A(i)), I(B(i)))$ |
|---|---|---|
| 0 | 0 | 0 |
| 0 | 1 | 0 |
| 1 | 0 | 0 |
| 1 | 1 | 1 |

TABLE 2

| I(A(i)) | I(B(i)) | $g_i(I(A(i)), I(B(i)))$ |
|---|---|---|
| 0 | 0 | 0 |
| 0 | 1 | 1 |
| 1 | 0 | 1 |
| 1 | 1 | 1 |

<<XOR Gate>>

TABLE 3

| I(A(i)) | I(B(i)) | $g_i(I(A(i)), I(B(i)))$ |
|---|---|---|
| 0 | 0 | 0 |
| 0 | 1 | 1 |
| 1 | 0 | 1 |
| 1 | 1 | 0 |

It is to be noted that the gate G(i) is not limited to the AND gate, the OR gate, and the XOR gate. Other 2-input 1-output logical gates, whose output value $g_i(1, 0)$ and output value $g_i(0, 1)$ are equal, may be used as the gate G(i). The circuit f of FIGS. 14A and 14B is an example and the present invention is not limited to this example. For example, one of the input wires of any gate G(i') may be an output wire of another gate G(i'') and the other of the input wires of the gate G(i') may be an input wire of the circuit f, not an output wire of any gate.

<Circuit Concealment Processing of the Circuit Concealing Apparatus 11>

Next, concealment processing which is performed on the circuit f=(n, in, u, A, B, g) by the circuit concealing apparatus 11 will be described by using FIGS. 6 to 10.

A security parameter k and the circuit f=(n, m, u, A, B, g) are input to the input unit 1112 of the circuit concealing apparatus 11 (FIG. 2) and stored in the storage 112. It is to be noted that k is a positive integer. For example, k is an integer greater than or equal to 2. For example, 2k>k+8 is satisfied. The initialization unit 114 sets a null field for each of a concealed circuit F, coding information e, and decoding information d so that |F|=u, |e|=n, and |d|=m. It is to be noted that |α| means the magnitude of α. Moreover, the initialization unit 114 initializes an internal counter to an initial value (for example, 0). The internal counter is incremented by 1 by nextindex( ) (Step S101). The controller 113 makes settings so that i:=n+1 (Step S102).

The input wire setter 115 makes settings so that A:=A(i) and B:=B(i) (Step S103). The determiner 1160 determines whether a label $L_A^{I(A)} \in \{0, 1\}$ of an input wire W(A) corresponding to an input value I(A) is not yet set (Step S104). It is to be noted that the label $L_A^{I(A)}$ is a value obtained by randomizing the input value $I(A) \in \{0, 1\}$. If the input wire W(A) is an output wire of another gate G(ι) (where $ι \in \{n+1, \ldots, n+u\}$), the label $L_A^{I(A)}$ is set (is set as a label $g_ι(I(A(ι)), I(B(ι)))(xor)λ(ι) \in \{0, 1\}$ of the output wire of the other gate G(ι) (Step S139, which will be described later)); otherwise, the label $L_A^{I(A)}$ is not yet set. In an example of FIGS. 14A and 14B, the label $L_A^{I(A)}$ is not yet set when $W(A) \in W_{input}$. If the label $L_A^{I(A)}$ is not yet set, the procedure proceeds to Step S105. On the other hand, if this is not a case where the label $L_A^{I(A)}$ is not yet set (if the label $L_A^{I(A)}$ is set), the procedure proceeds to Step S107. Unless otherwise specified, "$α^β$" does not represent a to the power of β.

In Step S105, the permutation bit setter 1161 randomly selects a permutation bit $λ(A) \in \{0, 1\}$ (Step S105). Next, the input label setter 1162 sets the label $L_A^{I(A)}=λ(A)(xor)I(A) \in \{0, 1\}$ for all $I(A) \in \{0, 1\}$ by using the permutation bit λ(A) as input and stores the label $L_A^{I(A)}$ in the storage 112. That is, the input label setter 1162 makes settings so that $L_A^0=λ(A)$ and $L_A^1=λ(A)(xor)1$ and stores $L_A^0$ and $L_A^1$ in the storage 112. It is to be noted that "α(xor)β" represents an XOR $$α ⊕ β$$

of α and β (Step S106). After Step S106, the procedure proceeds to Step S107.

In Step S107, the determiner 1160 determines whether a label $L_B^{I(B)}$ of an input wire W(B) corresponding to an input value I(B) is not yet set (Step S107). If the input wire W(B) is an output wire of another gate G(ι), the label $L_B^{I(B)}$ is set (is set as a label $g_ι(I(A(ι)), I(B(ι)))(xor)λ(ι)$ of the output wire of the other gate G(ι)); otherwise, the label $L_B^{I(B)}$ is not yet set. In the example of FIGS. 14A and 14B, the label $L_B^{I(B)}$ is not yet set when $W(B) \in W_{input}$. If the label $L_B^{I(B)}$ is not yet set, the procedure proceeds to Step S108. On the other hand, if this is not a case where the label $L_B^{I(B)}$ is not yet set (the label $L_B^{I(B)}$ is set), the procedure proceeds to Step S110.

In Step S108, the permutation bit setter 1161 randomly selects a permutation bit $λ(B) \in \{0, 1\}$ (Step S108). Next, the input label setter 1162 sets the label $L_B^{I(B)}=λ(B)(xor)I(B)$ for all $I(B) \in \{0, 1\}$ by using the permutation bit λ(B) as input and stores the label $L_B^{I(B)}$ in the storage 112. That is, the input label setter 1162 sets $L_B^0=λ(B)$ and $L_B^1=λ(B)(xor)1$ and stores $L_B^0$ and $L_B^1$ in the storage 112 (Step S109). After Step S109, the procedure proceeds to Step S110.

In Steps S110 to S130, at least any one of input keys $K_A^0$, $K_A^1$, $K_B^0$, and $K_B^1$, is set so that the input keys $K_A^0$, $K_A^1$, $K_B^0$, $K_B^1 \in F_q$ which satisfy $K_A^1-K_A^0=K_B^1-K_B^0=d_i$ are obtained. Here, $F_q$ represents a finite field of order q. q is a positive integer and the characteristic of the finite field $F_q$ is 3 or greater. Moreover, an XOR $bit_α(xor)bit_β$ of a bit string $bit_α \in \{0, 1\}^k$, which is obtained by expressing $α \in F_q$ in k bits, and a bit string $bit_β \in \{0, 1\}^k$, which is obtained by expressing $β \in F_q$ in k bits, is written as "α(xor)β". That is, an XOR α(xor)β of $α \in F_q$ and $β \in F_q$ means $bit_α(xor)bit_β$. In Step S110, the determiner 1171 determines whether an input key $K_A^{I(A)} \in F_q$ of the input wire W(A) corresponding to the input value $I(A) \in \{0, 1\}$ is set and an input key $K_B^{I(B)} \in F_q$ of the input wire W(B) corresponding to the input value $I(B) \in \{0, 1\}$ is set (Step S110). If the input wire W(A) is the output wire of the other gate G(ι), the input key $K_A^{I(A)}$) is set (is set as an input key $K_ι^{g(I(A(ι)), I(B(ι)))}$ of the output wire of the other gate G(ι) (Steps S134 and S135, which will be described later)); otherwise, the input key $K_A^{I(A)}$ is not set. In the example of FIGS. 14A and 14B, the input key $K_A^{I(A)}$ is not yet set when $W(A) \in W_{input}$; otherwise, the input key $K_A^{I(A)}$ is set. Likewise, if the input wire W(B) is the output wire of the other gate G(ι), the input key $K_B^{I(B)}$ is set (is set as an input key $K_ι^{g(I(A(ι)), I(B(ι)))}$ of the output wire of the other gate G(ι)); otherwise, the input key $K_B^{I(B)}$ is not set. In the example of FIGS. 14A and 14B, the input key $K_B^{I(B)}$ is not yet set when $W(B) \in W_{input}$; otherwise, the input key $K_B{}^{I(B)}$ is set. If the input key $K_A{}^{I(A)}$ is set and the input key $K_B{}^{I(B)}$ is set, the procedure proceeds to Step S111; otherwise, the procedure proceeds to Step S116.

In Step S111, the subtractor 1172a (FIG. 3A) of the input key setter 1172 obtains $d_i = K_A{}^1 - K_A{}^0 \in F_q$ by using $K_A{}^1$ and $K_A{}^0$ as input and outputs $d_i$ (Step S111).

$$d_i := K_A{}^1 - K_A{}^0$$

Next, the setter 1172b obtains $K_{B'}{}^{\lambda(B)} = K_B{}^{\lambda(B)}$ by using, as input, $K_B{}^{\lambda(B)}$ for the label $L_B{}^{I(B)} = \lambda(B)(xor)I(B)$ corresponding to the input value I(B) and outputs $K_{B'}{}^{\lambda(B)}$ (Step S112).

$$K_{B'}{}^{\lambda(B)} := K_B{}^{\lambda(B)}$$

Next, the setter 1172c obtains $K_{B'}{}^{1(xor)\lambda(B)} = K_{B'}{}^{\lambda(B)} + (-1)^{\lambda(B)} d_i$ by using $K_{B'}{}^{\lambda(B)}$ and $d_i$ as input and outputs $K_{B'}{}^{1(xor)\lambda(B)}$ (Step S113).

$$K_{B'}{}^{1(xor)\lambda(B)} = K_{B'}{}^{\lambda(B)} + (-1)^{\lambda(B)} d_i$$

where $(-1)^{\lambda(B)} = 1$ when $\lambda(B) = 0$ and $(-1)^{\lambda(B)} = -1$ when $\lambda(B) = 1$. That is, $(-1)^{\lambda(B)}$ represents $(-1)$ to the power of $\lambda(B)$.

Next, the setter 1172d increments the internal counter by 1 by nextindex( ) and outputs the value of the internal counter after increment as $j_E$ (Step S114).

$$j_E := \text{nextindex}(\ )$$

Next, the encryptor 1172e obtains, by using $K_{B'}{}^{1(xor)\lambda(B)}$, $j_E$, and $K_{B'}{}^{1(xor)\lambda(B)}$ as input, an XOR of a hash value $H(K_{B'}{}^{1(xor)\lambda(B)}, j_E) \in F_q$ corresponding to the input key $K_{B'}{}^{1(xor)\lambda(B)}$ and the index $j_E$ and the input key $K_{B'}{}^{1(xor)\lambda(B)} \in F_q$ as cipher text $E_i \in F_q$ and outputs $E_i$. It is to be noted that H is a hash function that outputs an element of $F_q$, which corresponds to input; for example, $H(\alpha, \beta)$ is the hash value of a bit concatenated value of $\alpha$ and $\beta$. Moreover, $E_i$ corresponds to cipher text obtained by encrypting $K_{B'}{}^{1(xor)\lambda(B)}$ by using, as a symmetric key, the function value $(H(K_{B'}{}^{1(xor)\lambda(B)}, j_E))$ of a value including the input key $K_{B'}{}^{1(xor)\lambda(B)}$ (Step S115).

$$E_i := H(K_{B'}{}^{1(xor)\lambda(B)}, j_E)(xor) K_{B'}{}^{1(xor)\lambda(B)}$$

After Step S115, the procedure proceeds to Step S131.

In Step S116, the determiner 1171 determines whether the input key $K_A{}^{I(A)} \in F_q$ is set. If the input key $K_A{}^{I(A)}$ is set (if the input key $K_A{}^{I(A)}$ is set and the input key $K_B{}^{I(B)}$ is not set), the procedure proceeds to Step S117; if the input key $K_A{}^{I(A)}$ is not set, the procedure proceeds to Step S122 (Step S116).

In Step S117, the subtractor 1173a (FIG. 3B) of the input key setter 1173 obtains $d_i = K_A{}^1 - K_A{}^0 \in F_q$ by using $K_A{}^1$ and $K_A{}^0$ as input (Step S117), the selector 1173b randomly selects $K_B{}^0 \in F_q$ (Step S118), the setter 1173c obtains $K_B{}^1 = K_B{}^0 + d_i$ by using $K_B{}^0$ and $d_i$ as input (Step S119), the setter 1173d outputs the input $K_B{}^0$ as the input key $K_{B'}{}^0$ (Step S120), and the setter 1173e outputs the input $K_B{}^1$ as the input key $K_{B'}{}^1$ (Step S121).

$$d_i := K_A{}^1 - K_A{}^0$$

$$K_B{}^0 \in F_q$$

$$K_B{}^1 := K_B{}^0 + d_i$$

$$K_{B'}{}^0 := K_B{}^0$$

$$K_{B'}{}^1 := K_B{}^1$$

That is, when the input key $K_A{}^{I(A)}$ is set and the input key $K_B{}^{I(B)}$ is not set, the input key setter 1173 obtains $d_i = K_A{}^1 - K_A{}^0$ and obtains the input key $K_B{}^1$ and the input key $K_B{}^0$, which satisfy $K_{B'}{}^1 = K_{B'}{}^0 + d_i$. After Step S121, the procedure proceeds to Step S131.

In Step S122, the determiner 1171 determines whether the input key $K_B{}^{I(B)} \in F_q$ is set (Step S122). If the input key $K_B{}^{I(B)}$ is set (if the input key $K_B{}^{I(B)}$ is set and the input key $K_A{}^{I(A)}$ is not set), the procedure proceeds to Step S123; if the input key $K_B{}^{I(B)}$ is not set (if the input key $K_A{}^{I(A)}$ and the input key $K_B{}^{I(B)}$ are not set), the procedure proceeds to Step S126.

In Step S123, the subtractor 1173a (FIG. 3B) of the input key setter 1173 obtains $d_i = K_B{}^1 - K_B{}^0 \in F_q$ by using $K_B{}^1$ and $K_B{}^0$ as input (Step S123), the selector 1173b randomly selects $K_A{}^0 \in F_q$ (Step S124), the setter 1173c obtains $K_A{}^1 = K_A{}^0 + d_i$ by using $K_A{}^0$ and $d_i$ as input (Step S125), the setter 1173d outputs the input $K_B{}^0$ as the input key $K_{B'}{}^0$ (Step S120), and the setter 1173e outputs the input $K_B{}^1$ as the input key $K_{B'}{}^1$ (Step S121).

$$d_i := K_B{}^1 - K_B{}^0$$

$$K_A{}^0 \in F_q$$

$$K_A{}^1 := K_A{}^0 + d_i$$

$$K_{B'}{}^0 := K_B{}^0$$

$$K_{B'}{}^1 := K_B{}^1$$

That is, when the input key $K_B{}^{I(B)}$ is set and the input key $K_A{}^{I(A)}$ is not set, the input key setter 1173 obtains $d_i = K_B{}^1 - K_B{}^0$, obtains the input key $K_A{}^1$ and the input key $K_A{}^0$ which satisfy $K_A{}^1 = K_A{}^0 + d_i$, and sets the input key $K_{B'}{}^{I(B)}$ as the input key $K_B{}^{I(B)}$. After Step S121, the procedure proceeds to Step S131.

In Step S126, the selector 1174a (FIG. 3C) of the input key setter 1174 randomly selects $K_A{}^0$, $K_B{}^0$, $d_i \in F_q$ (Step S126), the setter 1174b obtains $K_A{}^1 = K_A{}^0 + d_i$ by using $K_A{}^0$ and $d_i$ as input (Step S127), the setter 1174c obtains $K_B{}^1 = K_B{}^0 + d_i$ by using $K_B{}^0$ and $d_i$ as input (Step S128), the setter 1174d outputs the input $K_B{}^0$ as the input key $K_{B'}{}^0$ (Step S129), and the setter 1174e outputs the input $K_B{}^1$ as the input key $K_{B'}{}^1$ (Step S130).

$$K_A{}^0, K_B{}^0, d_i \in F_q$$

$$K_A{}^1 := K_A{}^0 + d_i$$

$$K_B{}^1 := K_B{}^0 + d_i$$

$$K_{B'}{}^0 := K_B{}^0$$

$$K_{B'}{}^1 := K_B{}^1$$

That is, when the input key $K_A{}^{I(A)}$ and the input key $K_B{}^{I(B)}$ are not set, the input key setter 1174 randomly selects $d_i$ and obtains the input key $K_A{}^1$ and the input key $K_A{}^0$ which satisfy $K_A{}^1 = K_A{}^0 + d_i$ and the input key $K_B{}^1$ and the input key $K_B{}^0$ which satisfy $K_{B'}{}^1 = K_{B'}{}^0 + d_i$. After Step S130, the procedure proceeds to Step S131.

In Steps S131 to S136, an output key $K_i{}^{g(I(A), I(B))}$ corresponding to the output value $g_i(I(A), I(B)) \in \{0, 1\}$ is set by using the input keys $K_A{}^0$, $K_A{}^1$, $K_B{}^0$, and $K_B{}^1$ and, furthermore, $\gamma^{(0, 0)}$, $\gamma^{(0, 1)} = \gamma^{(1, 0)}$, and $\gamma^{(1, 1)}$ are obtained. It is to be noted that, when a gate $G(\theta)$ whose input wire $W(A(\theta))$ is the output wire $W(i)$ of the gate $G(i)$ is present, the output key $K_i{}^{g(I(A), I(B))}$ is an input key $K_A{}^{I(A(\theta))}$ of the gate $G(\theta)$. When a gate $G(\theta)$ whose input wire $W(B(\theta))$ is the output wire $W(i)$ of the gate $G(i)$ is present, the output key $K_i{}^{g(I(A), I(B))}$ is an input key $K_B{}^{I(B(\theta))}$ of the gate $G(\theta)$. Processing in Steps S131 to S136 differs depending on the type of the gate G(i). Hereinafter, processing in Steps S131 to S136 when the gate G(i) is the AND gate, when the gate G(i) is the OR gate, and when the gate G(i) is the XOR gate will be described.

<<When the Gate G(i) is the AND Gate>>

In Step S131, the setter 1181 (FIG. 2) increments the internal counter by 1 by nextindex( ) and outputs the value of the internal counter after increment as $j_L$ (Step S131).

$j_L := \text{nextindex}(\ )$

Next, the $\Psi$ setter 1182 obtains, by using $K_A^0$, $K_B^0$, $d_i$, and $j_L$ as input, an XOR $\Psi_i \in F_q$ of a hash value $H(K_A^0+K_B^0, j_L) \in F_q$ corresponding to $K_A^0+K_B^0$ and the index $j_L$ and a hash value $H(K_A^0+K_B^0+d_i, j_L) \in F_q$ corresponding to $K_A^0+K_B^0+d_i$ and the index $j_L$ and outputs the XOR $\Psi_i$. That is, the $\Psi$ setter 1182 obtains an XOR $\Psi_i$ of the function value $(H(K_A^0+K_B^0, j_L))$ of a value including $K_A^0+K_B^0$ and the function value $(H(K_A^0+K_B^0+d_i, j_L))$ of a value including $K_A^0+K_B^0+d_i$ (Step S132). $\Psi_i := H(K_A^0+K_B^0, j_L)(\text{xor})H(K_A^0+K_B^0+d_i, j_L)$ The RB selector 1183 randomly selects arbitrary values $b_0, b_1 \in \{0, 1\}$ and outputs the arbitrary values $b_0$ and $b_1$ (Step S133).

$b_0, b_1 \in \{0,1\}$

The output key setter 1184 outputs, by using $K_A^0$, $K_B^0$, $b_0$, $d_i$, and $j_L$ as input, a hash value $H(K_A^0+K_B^0+b_0 d_i, j_L) \in F_q$ corresponding to $K_A^0+K_B^0+b_0 d_i$ and the index $j_L$ as an output key $K_i^0$. That is, the output key setter 1184 sets the function value $(H(K_A^0+K_B^0+b_0 d_i, j_L))$ of a value including $K_A^0+K_B^0+b_0 d_i$ as the output key $K_i^0$ (Step S134).

$K_i^0 := H(K_A^0+K_B^0+b_0 d_i, j_L)$

The output key setter 1185 outputs, by using $K_A^0$, $K_B^0$, $d_i$, $j_L$, $b_1$, and $\Psi_i$ as input, an XOR of a hash value $H(K_A^0+K_B^0+2d_i, j_L) \in F_q$ corresponding to $K_A^0+K_B^0+2d_i$ and the index $j_L$ and $b_1 \Psi_i \in F_q$ as an output key $K_i^1$. That is, the output key setter 1185 sets an XOR of the function value $(H(K_A^0+K_B^0+2d_i, j_L))$ of a value including $K_A^0+K_B^0+2d_i$ and $b_1 \Psi_i$ as the output key $K_i^1$ (Step S135).

$K_i^1 := H(K_A^0+K_B^0+2d_i, j_L)(\text{xor})b_1 \Psi_i$

The $\gamma$ setter 1186 obtains $\gamma^{(0,0)} = b_0$, $\gamma^{(0,1)} = \gamma^{(1,0)} = 1(\text{xor})b_0$, and $\gamma^{(1,1)} = b_1$ by using $b_0$ and $b_1$ as input and outputs $\gamma^{(0,0)}$, $\gamma^{(0,1)} = \gamma^{(1,0)}$, and $\gamma^{(1,0)}$ (Step S136).

$\gamma^{(0,0)} := b_0, \gamma^{(0,1)} := \gamma^{(1,0)} := 1(\text{xor})b_0, \gamma^{(1,1)} := b_1$ <<When the Gate G(i) is the OR Gate>>

In Step S131, the setter 1181 increments the internal counter by 1 by nextindex( ) and outputs the value of the internal counter after increment as $j_L$ (Step S131).

$j_L := \text{nextindex}(\ )$

Next, the $\Psi$ setter 1182 obtains, by using $K_A^0$, $K_B^0$, $d_i$, and $j_L$ as input, an XOR $\Psi_i$ of a hash value $H(K_A^0+K_B^0+d_i, j_L) \in F_q$ corresponding to $K_A^0+K_B^0+d_i$ and the index $j_L$ and a hash value $H(K_A^0+K_B^0+2d_i, j_L) \in F_q$ corresponding to $K_A^0+K_B^0+2d_i$ and the index $j_L$ and outputs the XOR $\Psi_i$. That is, the $\Psi$ setter 1182 obtains an XOR $\Psi_i$ of the function value $(H(K_A^0+K_B^0+d_i, j_L))$ of a value including $K_A^0+K_B^0+d_i$ and the function value $(H(K_A^0+K_B^0+2d_i, j_L))$ of a value including $K_A^0+K_B^0+2d_i$ (Step S132).

$\Psi_i := H(K_A^0+K_B^0+d_i, j_L)(\text{xor})H(K_A^0+K_B^0+2d_i, j_L)$

The RB selector 1183 randomly selects arbitrary values $b_0, b_1 \in \{0, 1\}$ and outputs the arbitrary values $b_0$ and $b_1$ (Step S133).

$b_0, b_1 \in \{0,1\}$

The output key setter 1184 outputs, by using $K_A^0$, $K_B^0$, $j_L$, $b_1$, and $\Psi_i$ as input, an XOR of a hash value $H(K_A^0+K_B^0, j_L) \in F_q$ corresponding to $K_A^0+K_B^0$ and the index $j_L$ and $b_1 \Psi_i$ as the output key $K_i^0$. That is, the output key setter 1184 sets an XOR of the function value $(H(K_A^0+K_B^0, j_L))$ of a value including $K_A^0+K_B^0$ and $b_1 \Psi_i$ as the output key $K_i^0$ (Step S134).

$K_i^0 := H(K_A^0+K_B^0, j_L)(\text{xor})b_1 \Psi_i$

The output key setter 1185 outputs, by using $K_A^0$, $K_B^0$, $d_i$, $b_0$, and $j_L$ as input, an XOR of a hash value $H(K_A^0+K_B^0+d_i+b_0 d_i, j_L) \in F_q$ corresponding to $K_A^0+K_B^0+d_i+b_0 d_i$ and the index $j_L$ and $b_1 \Psi_i \in F_q$ as the output key $K_i^1$. That is, the output key setter 1185 sets the function value $(H(K_A^0+K_B^0+d_i+b_0 d_i, j_L))$ of a value including $K_A^0+K_B^0+d_i+b_0 d_i$ as the output key $K_i^1$ (Step S135).

$K_i^1 := H(K_A^0+K_B^0+d_i+b_0 d_i, j_L)$

The $\gamma$ setter 1186 obtains $\gamma^{(0,0)} = b_1$, $\gamma^{(0,1)} = \gamma^{(1,0)} = b_0$, and $\gamma^{(1,1)} = 1(\text{xor})b_0$ by using $b_0$ and $b_1$ as input and outputs $\gamma^{(0,0)}$, $\gamma^{(0,1)} = \gamma^{(1,0)}$, and $\gamma^{(1,1)}$ (Step S136).

$\gamma^{(0,0)} := b_1, \gamma^{(0,1)} := \gamma^{(1,0)} := b_0, \gamma^{(1,1)} := 1(\text{xor})b_0$ <<When the Gate G(i) is the XOR Gate>>

In Step S131, the setter 1181 increments the internal counter by 1 by nextindex( ) and outputs the value of the internal counter after increment as $j_L$ (Step S131).

$j_L := \text{nextindex}(\ )$

Next, the $\Psi$ setter 1182 obtains, by using $K_A^0$, $K_B^0$, $j_L$, and $d_i$ as input, an XOR $\Psi_i$ of a hash value $H(K_A^0+K_B^0, j_L) \in F_q$ corresponding to $K_A^0+K_B^0$ and the index $j_L$ and a hash value $H(K_A^0+K_B^0+2d_i, j_L) \in F_q$ corresponding to $K_A^0+K_B^0+2d_i$ and the index $j_L$ and outputs the XOR Ti. That is, the $\Psi$ setter 1182 obtains an XOR $\Psi_i$ of the function value $(H(K_A^0+K_B^0, j_L))$ of a value including $K_A^0+K_B^0$ and the function value $(H(K_A^0+K_B^0+2d_i, j_L))$ of a value including $K_A^0+K_B^0+2d_i$ (Step S132). $\Psi_i := H(K_A^0+K_B^0, j_L)(\text{xor})H(K_A^0+K_B^0+2d_i, j_L)$ The RB selector 1183 randomly selects arbitrary values $b_0, b_1 \in \{0, 1\}$ and outputs the arbitrary values $b_0$ and $b_1$ (Step S133).

$b_0, b_1 \in \{0,1\}$

The output key setter 1184 outputs, by using $K_A^0$, $K_B^0$, $b_0$, $d_i$, and $j_L$ as input, a hash value $H(K_A^0+K_B^0+2b_0 d_i, j_L) \in F_q$ corresponding to $K_A^0+K_B^0+2b_0 d_i$ and the index $j_L$ as the output key $K_i^0$. That is, the output key setter 1184 sets the function value $(H(K_A^0+K_B^0+2b_0 d_i, j_L))$ of a value including $K_A^0+K_B^0+2b_0 d_i$ as the output key $K_i^0$ (Step S134).

$K_i^0 := H(K_A^0+K_B^0+2b_0 d_i, j_L)$

The output key setter 1185 outputs, by using $K_A^0$, $K_B^0$, $d_i$, $j_L$, $b_1$, and $\Psi_i$ as input, an XOR of a hash value $H(K_A^0+K_B^0+d_i, j_L) \in F_q$ corresponding to $K_A^0+K_B^0+d_i$ and the index $j_L$ and $b_1 \Psi_i \in F_q$ as the output key $K_i^1$. That is, the output key setter 1185 sets an XOR of the function value $(H(K_A^0+K_B^0+d_i, j_L))$ of a value including $K_A^0+K_B^0+d_i$ and $b_1 \Psi_i$ as the output key $K_i^1$ (Step S135).

$K_i^1 := H(K_A^0+K_B^0+d_i, j_L)(\text{xor})b_1 \Psi_i$

The $\gamma$ setter 1186 obtains $\gamma^{(0,0)} = 1(\text{xor})b_0$, $\gamma^{(0,1)} = \gamma^{(1,0)} = b_1$, and $\gamma^{(1,1)} = b_0$ by using $b_0$ and $b_1$ as input and outputs $\gamma^{(0,0)}$, $\gamma^{(0,1)} = \gamma^{(1,0)}$, and $\gamma^{(1,1)}$ (Step S136).

$\gamma^{(0,0)} := b_0, \gamma^{(0,1)} := \gamma^{(1,0)} := b_1, \gamma^{(1,1)} := 1(\text{xor})b_0$ After Steps S131 to S136, the setter 1191 increments the internal counter by 1 by nextindex( ) and outputs the value of the internal counter after increment as $j_{L,\gamma}$ (Step S137).

$$j_{L,\gamma} := \text{nextindex}( )$$

The RPB selector 1192 randomly selects a permutation bit $\lambda(i) \in \{0, 1\}$ and outputs the permutation bit $\lambda(i)$ (Step S138).

For all of $I(A), I(B) \in \{0, 1\}$, by using $K_A^{I(A)}, K_{B'}^{I(B)}, j_{L,\gamma}, \lambda(i)$, and $\gamma^{(I(A), I(B))}$ as input, the encryptor 1193 (an output label setter) obtains and outputs $$b_{2L_A^{I(A)} + L_B^{I(B)}}^{L,\gamma} :=$$

$$\text{lsb}_2\big(H\big(K_A^{I(A)} \mid K_{B'}^{I(B)}, j_{L,\gamma}\big)\big) \oplus (g_i(I(A), I(B)) \oplus \lambda(i) \mid Y^{(I(A), I(B))})$$

where $\text{lsb}_2(\alpha)$ represents 2 bits from the least significant bit to the second bit of the bit string $\text{bit}_\alpha \in \{0, 1\}^k$ which is obtained by expressing $\alpha \in F_q$ in k bits. $g_i(I(A), I(B))$ is determined in accordance with the gate $G(i)$. $g_i(I(A), I(B))$ (xor)$\lambda(i)$ is a label $L_i^{g(I(A), I(B))} \in \{0, 1\}$ set for the output value $g_i(I(A), I(B))$. When a gate $G(\theta)$ whose input wire $W(A(O))$ is the output wire $W(i)$ of the gate $G(i)$ is present, the label $L_i^{g(I(A), I(B))}$ is a label $L_A^{I(A(\theta))}$ of the gate $G(\theta)$. When a gate $G(\theta)$ whose input wire $W(B(\theta))$ is the output wire $W(i)$ of the gate $G(i)$ is present, the label $L_i^{g(I(A), I(B))}$ is a label $L_B^{I(B(\theta))}$ of the gate $G(\theta)$. $\alpha|\beta$ is bit concatenation of $\alpha$ and $\beta$.

$$b_{2L_A^{I(A)} + L_B^{I(B)}}^{L,\gamma}$$

is cipher text obtained by encrypting the label $L_i^{g(I(A), I(B))} = g_i(I(A), I(B))(\text{xor})\lambda(i)$ set for the output value $g_i(I(A), I(B))$ and $\gamma^{(I(A), I(B))}$ by using, as a symmetric key, the function value $$\text{lsb}_2(H(K_A^{I(A)} \mid K_B^{I(B)} j_{L,\gamma}))$$

of a value including the input keys $K_A^{I(A)}$ and $K_{B'}^{I(B)}$ (Step S139).

If the cipher text $E_i$ is set in Step S115, the F setter 1194 obtains a concealed gate $F[i]:= (b_0^{L,\gamma}, b_1^{L,\gamma}, b_2^{L,\gamma}, b_3^{L,\gamma}, \Psi_i, E_i)$ by using $b_0^{L,\gamma}, b_1^{L,\gamma}, b_2^{L,\gamma}, b_3^{L,\gamma}, \Psi_i$, and $E_i$ as input and outputs the concealed gate $F[i]$. On the other hand, if the cipher text $E_i$ is not set in Step S115, the F setter 1194 obtains a concealed gate $F[i]:= (b_0^{L,\gamma}, b_1^{L,\gamma}, b_2^{L,\gamma}, b_3^{L,\gamma}, \Psi_i)$ by using $b_0^{L,\gamma}, b_1^{L,\gamma}, b_2^{L,\gamma}, b_3^{L,\gamma}$, and $\Psi_i$ as input and outputs the concealed gate $F[i]$ (Step S140).

When $W(j)$ (where $j \in \{A, B\}$) is an input wire of the circuit f (in the example of FIGS. 14A and 14B, when $W(j) \in W_{input}$), the e setter 1195 obtains coding information $e[j]:= (K_j^0 | L_j^0, K_j^1 | L_j^1)$ by using $K_j^0, L_j^0, K_j^1$, and $L_j^1$ as input and outputs the coding information $e[j]$ (Step S141).

When $W(i)$ is an output wire of the circuit f (in the example of FIGS. 14A and 14B, when $W(i) \in W_{output}$), the d setter 1195 obtains decoding information $d[i-(n+u)+m]:= \lambda(i)$ by using $\lambda(i)$ as input and outputs the decoding information $d[i-(n+u)+m]$ (Step S142).

The controller 113 determines whether $i = n+u$ holds (Step S143). If $i = n+u$ does not hold, the controller 113 sets $i+1$ as new i ($i:=i+1$) (Step S144) and returns the processing to Step S103. On the other hand, if $i = n+u$ holds, the communication unit 1111 transmits the concealed circuit F made up of all the concealed gates $F[i]$ thus obtained, the coding information e made up of all the coding information $e[j]$ thus obtained, and the decoding information d made up of all the decoding information $d[i-(n+u)+m]$ thus obtained. Here, in the case of the circuit f illustrated in FIG. 14A, $F = (F[n+1], \ldots, F[n+u])$, $e = (e[1], \ldots, e[n])$, and $d = (\lambda(n+u-m+1), \ldots, \lambda(n+u))$. The concealed circuit F is transmitted to the calculation apparatus 13 along with m, and the coding information e is transmitted to the coding apparatus 12. If m is a constant, m is not transmitted to the calculation apparatus 13. The decoding information d is transmitted to the decoding apparatus 14 (Step S145).

<Coding Processing of the Coding Apparatus 12>

Figure 11A:
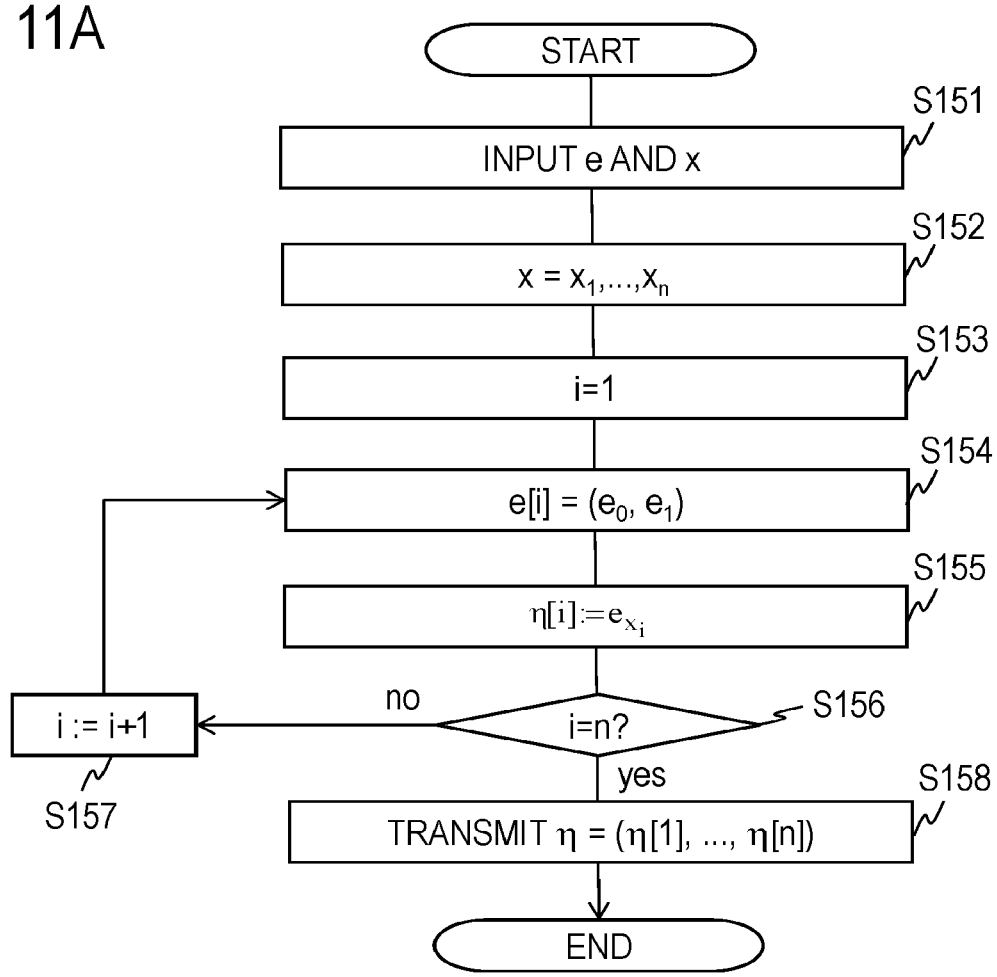
FIG. 11A is a flowchart for explaining coding processing of the embodiment.

Coding processing of the coding apparatus 12 will be described by using FIG. 11A.

The coding information e is input to the communication unit 1211 of the coding apparatus 12 (FIG. 4A) and an n-bit input value $x = (x_1, \ldots, x_n) \in \{0, 1\}^n$ is input to the input unit 1212 (Step S151). The separator 124 separates the input value x into bits $x_1, \ldots, x_n$ (Step S152). The controller 123 makes settings so that $i:=1$ (Step S153). The separator 125 separates $e[i]$ with which the coding information e is configured into $e[i] = (e_0, e_1)$ (Step S154). The encoder 126 obtains a code $$\eta[i] := e_{x_i}$$

by using $x_i \in \{0, 1\}$ and $e[i] = (e_0, e_1)$ (Step S155). The controller 123 determines whether $i = n$ holds (Step S156). If $i = n$ does not hold, the controller 123 sets $i+1$ as new i ($i:=i+1$) (Step S157) and returns the processing to Step S154. On the other hand, if $i = n$ holds, the communication unit 1211 transmits a code string $\eta = (\eta[1], \ldots, \eta[n])$. The code string $\eta$ is transmitted to the calculation apparatus 13 (Step S158).

<Calculation Processing of the Calculation Apparatus 13>

Figure 12:
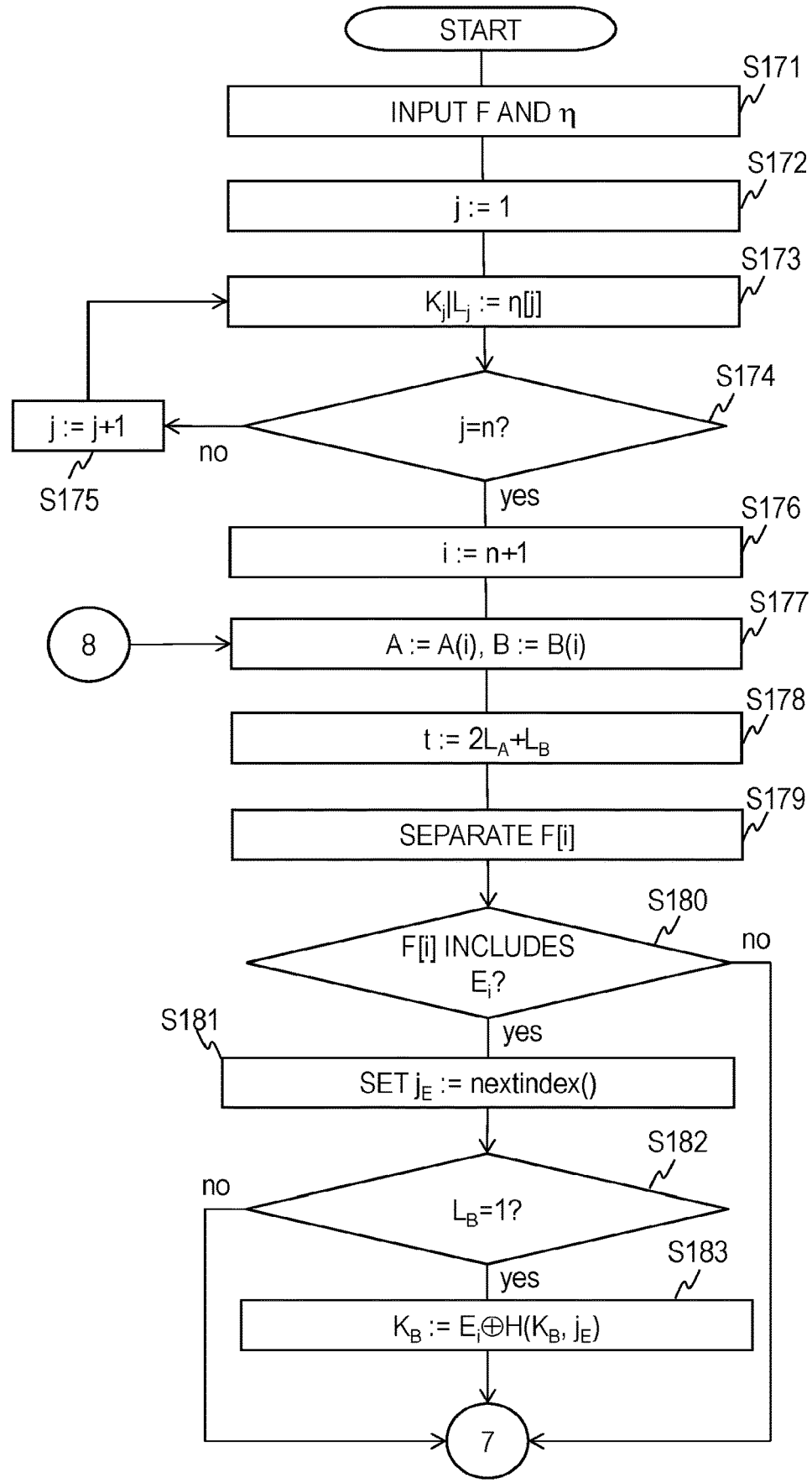
FIG. 12 is a flowchart for explaining concealed circuit calculation processing of the embodiment.
Figure 13:
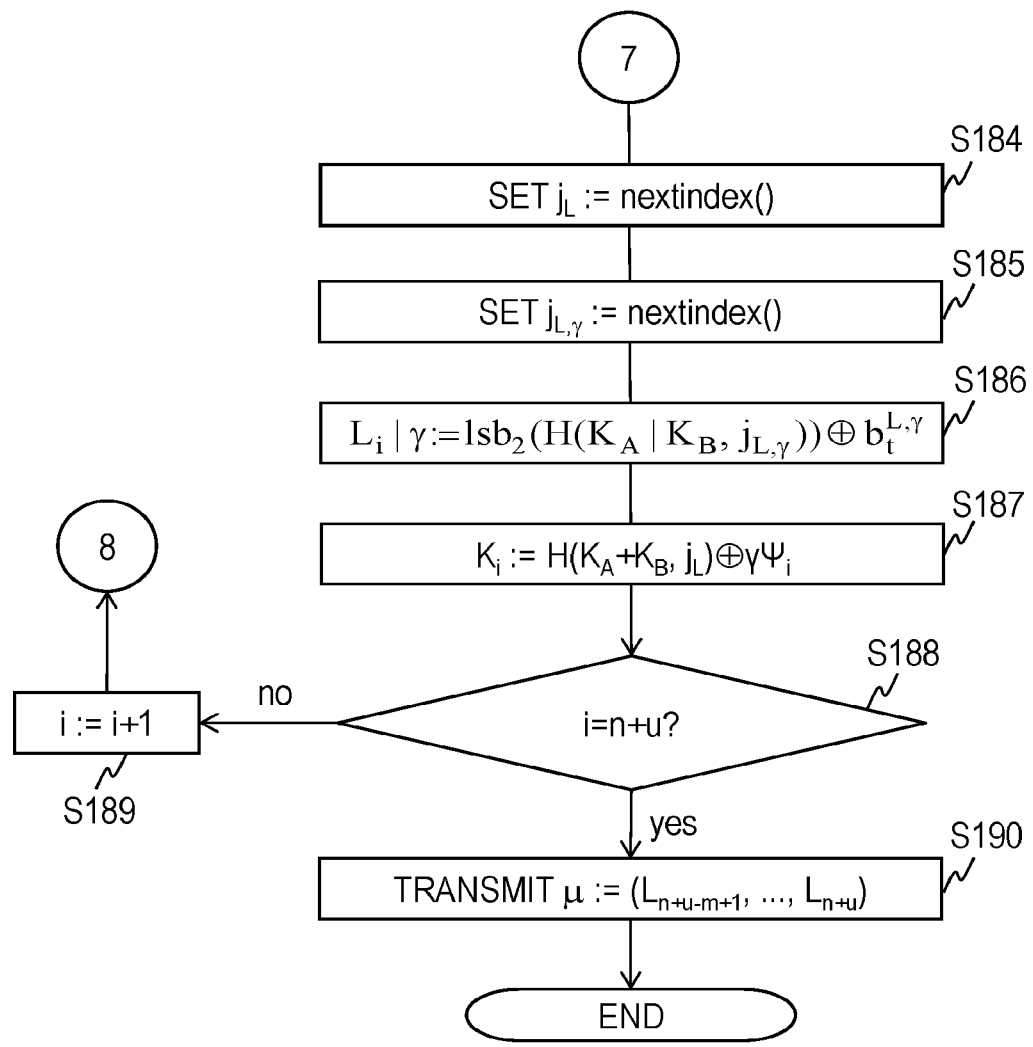
FIG. 13 is a flowchart for explaining the concealed circuit calculation processing of the embodiment.

Calculation processing of the calculation apparatus 13 will be described by using FIGS. 12 and 13.

The concealed circuit $F = (F[n+1], \ldots, F[n+u])$, m, and the code string $\eta = (\eta[1], \ldots, \eta[n])$ are input to the communication unit 1311 of the calculation apparatus 13 (FIG. 5). If m is a constant, m is not input. The controller 133 initializes the internal counter, which is incremented by 1 by nextindex( ), to an initial value (for example, 0) (Step S171).

The controller 133 makes settings so that $j:=1$ (Step S172). The separator 134 uses a code $\eta[j]$ as input and separates the code $\eta[j]$ into $K_j | L_j := \eta[j]$ (Step S173). The controller 133 determines whether $j = n$ holds (Step S174). If $j = n$ does not hold, the controller 133 sets $j+1$ as new j ($j:=j+1$) (Step S175) and returns the processing to Step S173. On the other hand, if $j = n$ holds, the controller 133 makes settings so that $i:=n+1$ (Step S176) and makes the processing proceed to Step S177.

In Step S177, the input wire setter 1351 makes settings so that $A:=A(i)$ and $B:=B(i)$ (Step S177). The label calculation unit 1352 obtains $t:=2L_A + L_B \in \{0, 1, 2, 3\}$ by using $L_A$ and $L_B$ as input and outputs t (Step S178). The separator 1353 separates $F[i]$, obtains $(b_0^{L,\gamma}, b_1^{L,\gamma}, b_2^{L,\gamma}, b_3^{L,\gamma}, \Psi_i, E_i)$ or $(b_0^{L,\gamma}, b_1^{L,\gamma}, b_2^{L,\gamma}, b_3^{L,\gamma}, \Psi_i)$, and stores $(b_0^{L,\gamma}, b_1^{L,\gamma}, b_2^{L,\gamma}, b_3^{L,\gamma}, \Psi_i, E_i)$ or $(b_0^{L,\gamma}, b_1^{L,\gamma}, b_2^{L,\gamma}, b_3^{L,\gamma}, \Psi_i)$ in the storage 132 (Step S179).

The determiner 1354 uses the output from the separator 1353 as input and determines whether $F[i]$ includes the cipher text $E_i$ (Step S180). Here, if $F[i]$ does not include the cipher text $E_i$, the procedure proceeds to Step S184. On the other hand, if $F[i]$ includes the cipher text $E_i$, the setter 1355 increments the internal counter by 1 by nextindex( ) and outputs the value of the internal counter after increment as $j_E$ (Step S181).

$$j_E := \text{nextindex}( )$$

The determiner 1354 determines whether $L_B=1$ holds by using the label $L_B$ as input (Step S182). Here, if $L_B=1$ does not hold, the procedure proceeds to Step S184. On the other hand, if $L_B=1$ holds, the key decoder 1356 obtains an XOR of $E_i$ and $H(K_B, j_E)$ as a new input key $K_B$ by using $K_B$, $j_E$, and $E_i$ as input and outputs the input key $K_B$. That is, the key decoder 1356 obtains a new input key $K_B$ by decoding the cipher text $E_i$ by using the function value ($H(K_B, j_E)$) of a value including the input key $K_B$ as a symmetric key (Step S183).

$$K_B := E_i(\text{xor})H(K_B, j_E)$$

After Step S183, the procedure proceeds to Step S184.

In Step S184, the setter 1357 increments the internal counter by 1 by nextindex( ) and outputs the value of the internal counter after increment as $j_L$ (Step S184).

$$j_L := \text{nextindex}(\ )$$

Then, the setter 1357 further increments the internal counter by 1 by nextindex( ) and outputs the value of the internal counter after increment as $j_{L,\gamma}$ (Step S185).

$$j_{L,\gamma} := \text{nextindex}(\ )$$

The decoder 1358 obtains an XOR of $\text{lsb}_2(H(K_A|K_B), j_{L,\gamma})$ and $b_t^{L,\gamma}$ as $L_i|\gamma$ by using $K_A$, $K_B$, $j_{L,\gamma}$, and $b_t^{L,\gamma}$ of $b_0^{L,\gamma}$, $b_1^{L,\gamma}$, $b_2^{L,\gamma}$, and $b_3^{L,\gamma}$ obtained in Step S179, which corresponds to $t \in \{0, 1, 2, 3\}$ obtained in Step S178, as input and outputs $L_i|\gamma$. That is, the decoder 1358 obtains $L_i$ and $\gamma = \gamma^{(I(A), I(B))}$ by decoding the cipher text $b_t^{L,\gamma}$ by using the function value ($\text{lsb}_2(H(K_A|K_B), j_{L,\gamma})$) of a value including $K_A$ and $K_B$ corresponding to the input value of the gate G(i) as a symmetric key (Step S186).

$$L_i|\gamma := \text{lsb}_2(H(K_A|K_B, j_{L,\gamma})) \oplus b_t^{L,\gamma}$$

The output key generator 1359 obtains an XOR of $H(K_A+K_B, j_L)$ and $\gamma\Psi_i$ as an output key $K_i$ by using $K_A$, $K_B$, $j_L$, $\gamma$, and $\Psi_i$ as input and outputs the output key $K_i$. That is, the output key generator 1359 obtains an XOR of the function value ($H(K_A+K_B, j_L)$) of a value including $K_A+K_B$ and $\gamma\Psi_i$ as the output key $K_i$ corresponding to the output value of the gate (Step S187).

$$K_i := H(K_A+K_B, j_L)(\text{xor})\gamma\Psi_i$$

The controller 133 determines whether $i=n+u$ holds (Step S188). If $i=n+u$ does not hold, the controller 133 sets i+1 as new i (i:=i+1) (Step S189) and returns the processing to Step S177. On the other hand, if $i=n+u$ holds, the output value generator 136 obtains a label sequence $\mu=(L_{n+u-m+1}, \ldots, L_{n+u})$ by using the label $L_i$ (where $i \in \{n+1, \ldots, n+u\}$) obtained in Step S186 and m as input. If m is a constant, m is not input. The communication unit 1311 transmits the label sequence p to the decoding apparatus 14 (Step S190).

$$\mu := (L_{n+u-m+1}, \ldots, L_{n+u})$$

<Decoding Processing of the Decoding Apparatus 14>

Figure 11B:
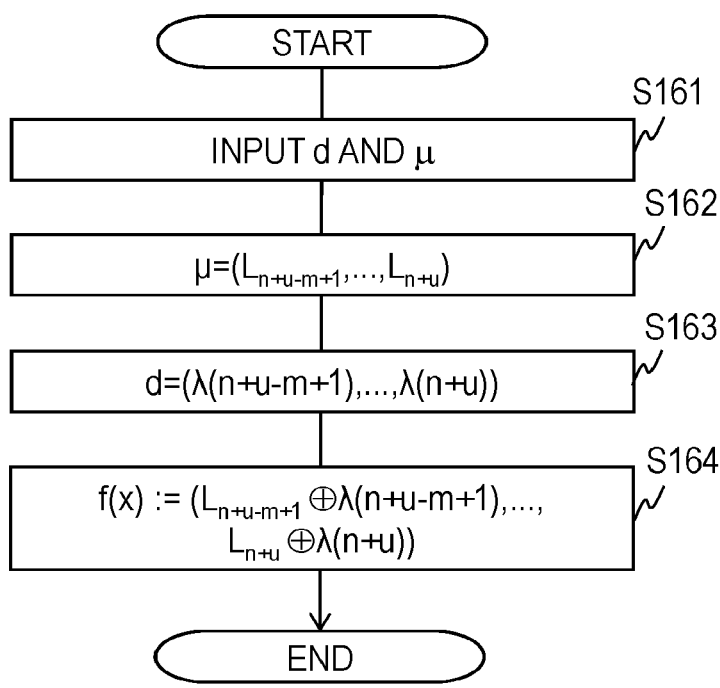
FIG. 11B is a flowchart for explaining decoding processing of the embodiment.

Next, decoding processing of the decoding apparatus 14 will be described by using FIG. 11B.

The decoding information $d=(\lambda(n+u-m+1), \ldots, \lambda(n+u))$ and the label sequence $\mu=(L_{n+u-m+1}, \ldots, L_{n+u})$ are input to the communication unit 1411 of the decoding apparatus 14 (FIG. 4B) (Step S161). The separator 144 separates the input label sequence $\mu$ into $L_{n+u-m+1}, \ldots, L_{n+u}$ and outputs $(L_{n+u-m+1}, \ldots, L_{n+u})$ (Step S162). The separator 145 separates the input decoding information d into $\lambda(n+u-m+1), \ldots, \lambda(n+u)$ and outputs $\lambda(n+u-m+1), \ldots, \lambda(n+u)$ (Step S163). The decoder 146 obtains a decoded value f(x) made up of $L_{n+u-m+1}(\text{xor})\lambda(n+u-m+1), \ldots, L_{n+u}(\text{xor})\lambda(n+u)$ by using $L_{n+u-m+1}, \ldots, L_{n+u}$ and $\lambda(n+u-m+1), \ldots, \lambda(n+u)$ as input and outputs the decoded value f(x) (Step S164).

$$f(x) := (L_{n+u-m+1}(\text{xor})\lambda(n+u-m+1), \ldots, L_{n+u}(\text{xor})(n+u))$$

Features of the Present Embodiment

In the present embodiment, in the circuit concealment processing, for each gate G(i), at least any one of the input keys $K_A^0$, $K_A^1$, $K_B^0$, and $K_B^1$ is set so that the input keys $K_A^0$, $K_A^1$, $K_B^0$, and $K_B^1$ which satisfy $K_A^1-K_A^0=K_B^1-K_B^0=d_i$ are obtained, and, by using the input keys $K_A^0$, $K_A^1$, $K_B^0$, and $K_B^1$, the output key $K_i^{g(I(A), I(B))}$ corresponding to the output value $g_i(I(A), I(B))$ is set (Steps S110 to S130). As a result, compared to an existing system that independently generates all the input keys $K_A^0$, $K_A^1$, $K_B^0$, and $K_B^1$, it is possible to reduce the amount of data of the concealed circuit F. In the present embodiment, an XOR $\Psi_i$ is calculated in Step S132 by using a fact that $K_A^1-K_A^0=K_B^1-K_B^0=d_i$ is satisfied and the XOR $\Psi_i$ is used as a member of each concealed gate F[i]. By doing so, the amount of data of each concealed gate F[i] is reduced. For instance, the bit length of each concealed gate $F[i]=(b_0^{L,\gamma}, b_1^{L,\gamma}, b_2^{L,\gamma}, b_3^{L,\gamma}, \Psi_i)$ which does not include the cipher text $E_i$ is k+8 bits, which is about half the amount of data of that of Non-patent Literature 1 in which the amount of data of each concealed gate is 2k bits (when k is sufficiently large; for example, k=128 or k=256). Since the normal security parameter k satisfies the relationship 2k>k+8, the system of the present embodiment can reduce the amount of data of a concealed circuit.

In Step S187, an output key is calculated by using $K_i := H(K_A+K_B, j_L)(\text{xor})\gamma\Psi_i$, and it is easily verified that a correct output key $K_i$ is obtained by doing so. For instance, when a case where the gate G(i) is the AND gate is taken up as an example, $\Psi_i := H(K_A^0+K_B^0, j_L)(\text{xor})H(K_A^0+K_B^0+d_i, j_L)$ in Step S132, $K_i^0 := H(K_A^0+K_B^0+b_0d_i, j_L)$ in Step S134, $K_i^1 := H(K_A^0+K_B^0+2d_i, j_L)(\text{xor})b_1\Psi_i$ in Step S135, and $\gamma^{(0, 0)} := b_0$, $\gamma^{(0, 1)} := \gamma^{(1, 0)} := 1(\text{xor})b_0$, and $\gamma^{(1, 1)} := b_1$ in Step S136. Furthermore, when a case where $(b_0, b_1)=(0, 0)$ is taken up as an example, $K_i^0 := H(K_A^0+K_B^0, j_L)$, $K_i^1 := H(K_A^0+K_B^0+2d_i, j_L)$, $\gamma^{(0, 0)} := 0$, $\gamma^{(0, 1)} := \gamma^{(1, 0)} := 1$, and $\gamma^{(1, 1)} := 0$. Here, when $I(A)=I(B)=0$, $\gamma = \gamma^{(0, 0)}=0$, and $K_i$ which is obtained in Step S187 is $K_i := H(K_A+K_B, j_L) = H(K_A^0+K_B^0, j_L)$. This coincides with $K_i^0 = H(K_A^0+K_B^0, j_L)$ corresponding to an output value $g_i(0, 0)=0$. When $I(A)=0$ and $I(B)=1$, $\gamma = \gamma^{(0, 1)}=1$, and $K_i$ which is obtained in Step S187 is $K_i = H(K_A+K_B, j_L)(\text{xor})\Psi_i = H(K_A^0+K_B^1, j_L)(\text{xor})H(K_A^0+K_B^0, j_L)(\text{xor})H(K_A^0+K_B^0+d_i, j_L) = H(K_A^0+K_B^0+d_i, j_L)(\text{xor})H(K_A^0+K_B^0, j_L)(\text{xor})H(K_A^0+K_B^0+d_i, j_L) = H(K_A^0+K_B^0, j_L)$. This coincides with $K_i^0 = H(K_A^0+K_B^0, j_L)$ corresponding to an output value $g_i(0, 1)=0$. When $I(A)=1$ and $I(B)=1$, $\gamma = \gamma^{(1, 1)}=0$, and $K_i$ which is obtained in Step S187 is $K_i = H(K_A+K_B, j_L) = H(K_A^1+K_B^1, j_L) = H(K_A^0+K_B^0+2d_i, j_L)$. This coincides with $K_i^1 = H(K_A^0+K_B^0+2d_i, j_L)$ corresponding to an output value $g_i(1, 1)=1$. Moreover, when a case where the gate G(i) is the OR gate is taken up as an example, $\Psi_i := H(K_A^0+K_B^0+d_i, j_L)(\text{xor})H(K_A^0+K_B^0+2d_i, j_L)$ in Step S132, $K_i^0 := H(K_A^0+K_B^0, j_L)(\text{xor})b_1\Psi_i$ in Step S134, $K_i^1 := H(K_A^0+K_B^0+d_i+b_0d_i, j_L)$ in Step S135, and $\gamma^{(0, 0)} := b_1$, $\gamma^{(0, 1)} := \gamma^{(1, 0)} := b_0$, and $\gamma^{(1, 1)} := 1(\text{xor})b_0$ in Step S136. Furthermore, when a case where $(b_0, b_1)=(0, 0)$ is taken up as an example, $K_i^0 := H(K_A^0+K_B^0, j_L)$, $K_i^1 := H(K_A^0+K_B^0+d_i, j_L)$, $\gamma^{(0, 0)} := 0$, $\gamma^{(0, 1)} := \gamma^{(1, 0)} := 0$, and $\gamma^{(1, 1)} := 1$. Here, when $I(A)=I(B)=0$, $\gamma = \gamma^{(0, 0)}=0$, and $K_i = H(K_A+K_B, j_L) = H(K_A^0+K_B^0, j_L)$, which is obtained in Step S187, coincides with $K_i^0=H(K_A^0+K_B^0, j_L)$ corresponding to an output value $g_i(0, 0)=0$. When $I(A)=0$ and $I(B)=1$, $\gamma=\gamma^{(0, 0)}=0$, and $K_i$ which is obtained in Step S187 is $K_i:=H(K_A+K_B, j_L)=H(K_A^0+K_B^1, j_L)=H(K_A^0+K_B^0+d_i, j_L)$. This coincides with $K_i^1=H(K_A^0+K_B^0+d_i, j_L)$ corresponding to an output value $g_i(0, 1)=1$. When $I(A)=1$ and $I(B)=1$, $\gamma=\gamma^{(1, 1)}=1$, and $K_i$ which is obtained in Step S187 is $K_i:=H(K_A+K_B, j_L)(xor)$ $\Psi_i=H(K_A^1+K_B^1, j_L)(xor)H(K_A^0+K_B^0+d_i, j_L)(xor)H(K_A^0+K_B^0+2d_i, j_L)=H(K_A^0+K_B^0+2d_i, j_L)(xor)H(K_A^0+K_B^0+d_i, j_L)(xor)H(K_A^0+K_B^0+2d_i, j_L)=H(K_A^0+K_B^0+d_i, j_L)$. This coincides with $K_i^1=H(K_A^0+K_B^0+d_i, j_L)$ corresponding to an output value $g_i(1, 1)=1$. Moreover, when a case where the gate G(i) is the XOR gate is taken up as an example, $\Psi_i=H(K_A^0+K_B^0, j_L)(xor)H(K_A^0+K_B^0+2d_i, j_L)$ in Step S132, $K_i^0:=H(K_A^0+K_B^0+2b_0d_i, j_L)$ in Step S134, $K_i^1=H(K_A^0+K_B^0+d_i, j_L)(xor)b_1\Psi_i$ in Step S135, and $\gamma^{(0, 0)}:=b_0$, $\gamma^{(0, 1)}:=\gamma^{(1, 0)}:=b_1$, and $\gamma^{(1, 1)}:=1(xor)b_0$ in Step S136. Furthermore, when a case where $(b_0, b_1)=(0, 0)$ is taken up as an example, $K_i^0:=H(K_A^0+K_B^0, j_L)$, $K_i^1:=H(K_A^0+K_B^0+d_i, j_L)$, $\gamma^{(0, 0)}:=0$, $\gamma^{(0, 1)}:=\gamma^{(1, 0)}:=0$, and $\gamma^{(1, 1)}:=1$. Here, when $I(A)=I(B)=0$, $\gamma^{(0, 0)}:=0$, and $K_i$ which is obtained in Step S187 is $K_i:=H(K_A+K_B, j_L)=H(K_A^0+K_B^0, j_L)$. This coincides with $K_i^0:=H(K_A^0+K_B^0, j_L)$ corresponding to an output value $g_i(0, 0)=0$. When $I(A)=0$ and $I(B)=1$, $\gamma=\gamma^{(0, 1)}=0$, and $K_i$ which is obtained in Step S187 is $K_i:=H(K_A+K_B, j_L)=H(K_A^0+K_B^1, j_L)=H(K_A^0+K_B^0+d_i, j_L)$. This coincides with $K_i^1:=H(K_A^0+K_B^0+d_i, j_L)$ corresponding to an output value $g_i(0, 1)=1$. When $I(A)=1$ and $I(B)=1$, $\gamma^{(1, 1)}:=1$, and $K_i$ which is obtained in Step S187 is $K_i:=H(K_A+K_B, j_L)(xor)\Psi_i=H(K_A^1+K_B^1, j_L)(xor)H(K_A^0+K_B^0, j_L)(xor)H(K_A^0+K_B^0+2d_i, j_L)=H(K_A^0+K_B^0+2d_i, j_L)(xor)H(K_A^0+K_B^0, j_L)(xor)H(K_A^0+K_B^0+2d_i, j_L)=H(K_A^0+K_B^0, j_L)$. This coincides with $K_i^0:=H(K_A^0+K_B^0, j_L)$ corresponding to an output value $g_i(1, 1)=0$. As described above, it is clear that a correct output key $K_i$ is obtained by Step S187.

Moreover, when the input key $K_A^{I(A)}$ of the gate G(i) is an output key $K_\alpha^{I(\alpha)}$ of another gate G($\alpha$) (the input key $K_A^{I(A)}$ is set) and the input key $K_B^{I(B)}$ is an output key $K_\beta^{I(\beta)}$ of another gate G($\beta$) (when the input key $K_B^{I(B)}$ is set), if $K_\alpha^{I(\alpha)}=K_A^{I(A)}$ itself is used as the input key $K_A^{I(A)}$ and $K_\beta^{I(\beta)}=K_B^{I(B)}$ itself is used as the input key $K_B^{I(B)}$, $K_A^1-K_A^0=K_B^1-K_B^0=d_i$ is usually not satisfied. In the present embodiment, in such a case, $d_i=K_A^1-K_A^0$ is obtained, $K_B^{\lambda(B)}=K_B^{\lambda(B)}$ is obtained for the label $L_B^{I(B)}=\lambda(B)(xor)I(B)$ corresponding to the input value I(B), $K_{B'}^{1(xor)\lambda(B)}=K_{B'}^{\lambda(B)}+(-1)^{\lambda(B)}d_i$ is obtained, and the cipher text $E_i$ obtained by encrypting $K_{B'}^{1(xor)\lambda(B)}$ by using the function value of a value including the input key $K_B^{1(xor)\lambda(B)}$ as a symmetric key is obtained (Steps S110 to S115). As a result, $K_A^1-K_A^0=K_{B'}^1-K_{B'}^0=d_i$ is satisfied. The calculation apparatus 13 can obtain a new input key $K_B=K_{B'}^{1(xor)\lambda(B)}$ by decoding the cipher text $E_i$ by using, as a symmetric key, the function value of a value including the input key $K_B$ which is the output key $K_\beta^{I(\beta)}$ of the other gate G($\beta$) (Step S183).

Second Embodiment

A second embodiment will be described by using the drawings. Hereinafter, a difference from the first embodiment will be mainly described. Explanations of the matters which are common to the first embodiment and the second embodiment will be simplified by using the above-mentioned reference numerals.

<Configuration>

As illustrated in FIG. 1, a secure computation system 2 of the present embodiment includes a circuit concealing apparatus 21, a coding apparatus 12, a calculation apparatus 23, and a decoding apparatus 14. The circuit concealing apparatus 21 is configured so as to be capable of providing information to the coding apparatus 12, the calculation apparatus 23, and the decoding apparatus 14, the coding apparatus 12 is configured so as to be capable of providing information to the calculation apparatus 23, and the calculation apparatus 23 is configured so as to be capable of providing information to the decoding apparatus 14. For example, the circuit concealing apparatus 21, the coding apparatus 12, the calculation apparatus 23, and the decoding apparatus 14 transmit and receive information via a network. As long as the circuit concealing apparatus 21 and the coding apparatus 12 are used by different parties, the calculation apparatus 23 and the decoding apparatus 14 may be used by any party. For the sake of simplification of explanations, in FIG. 1, one circuit concealing apparatus 21, one coding apparatus 12, one calculation apparatus 23, and one decoding apparatus 14 are depicted; however, as for at least any one of these apparatuses, more than one apparatus may be present.

<Circuit Concealing Apparatus 21>

Figure 15:
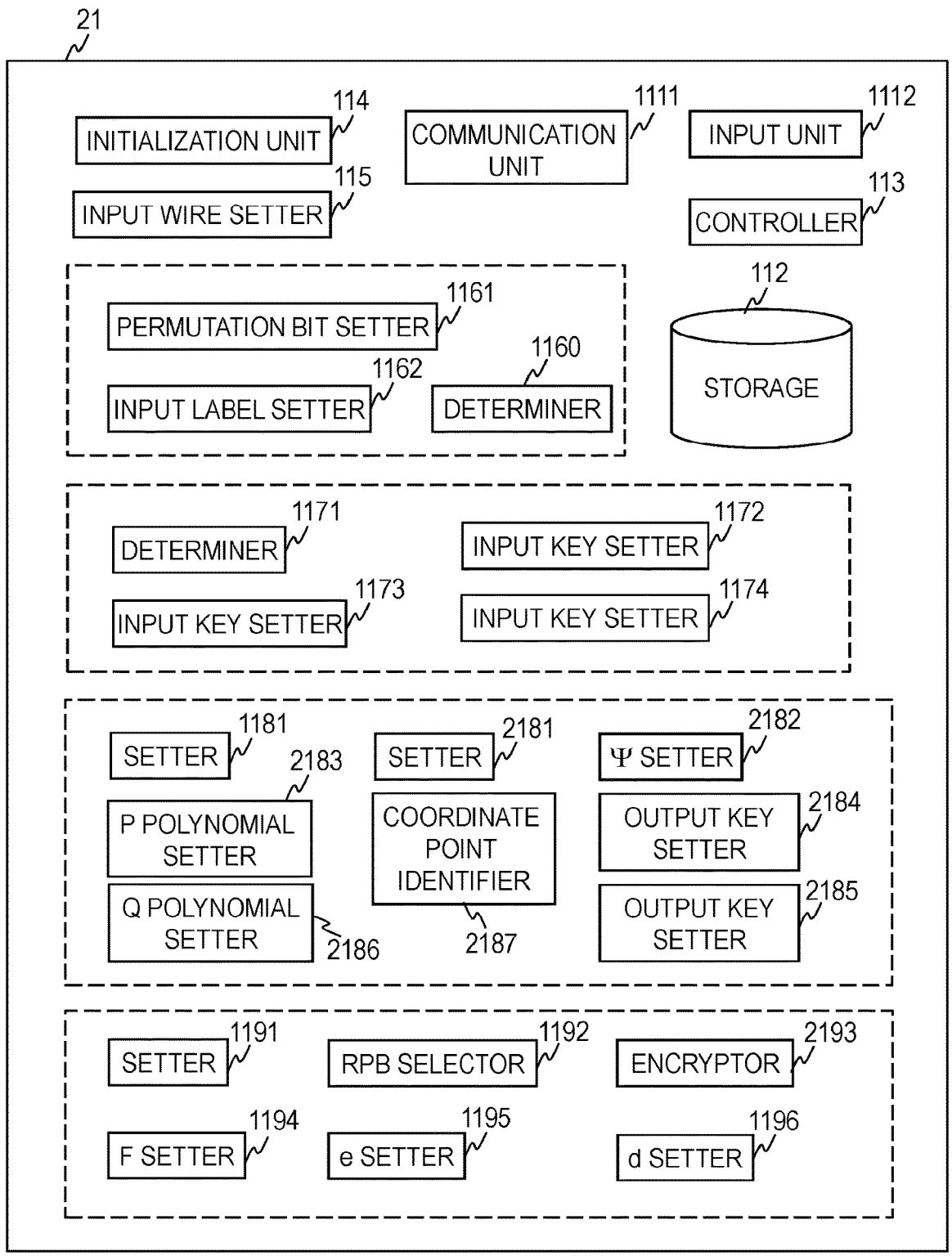
FIG. 15 is a block diagram illustrating the functional configuration of a circuit concealing apparatus of an embodiment.

As illustrated in FIG. 15, the circuit concealing apparatus 21 includes a communication unit 1111, an input unit 1112, a storage 112, a controller 113, an initialization unit 114, an input wire setter 115, a determiner 1160, a permutation bit setter 1161, an input label setter 1162, a determiner 1171, input key setters 1172 to 1174, setters 1181 and 2181, a $\Psi$ setter 2182, a P polynomial setter 2183, an output key setter 2184, an output key setter 2185, a Q polynomial setter 2186, a coordinate point identifier 2187, a setter 1191, an RPB selector 1192, an encryptor 2193, an F setter 1194, an e setter 1195, and a d setter 1196.

<Calculation Apparatus 23>

Figure 16:
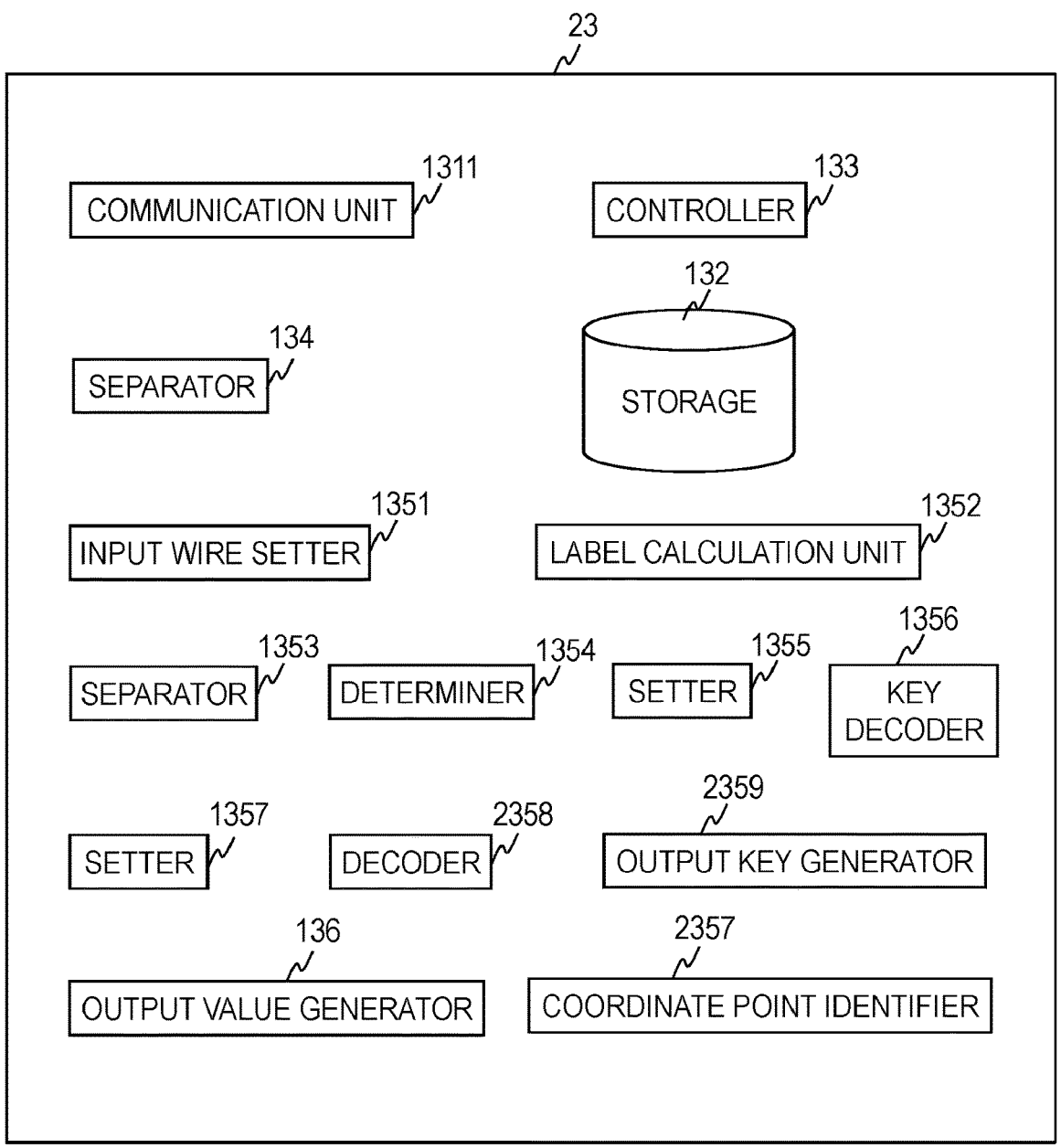
FIG. 16 is a block diagram illustrating the functional configuration of a calculation apparatus of the embodiment.
Figure 17:
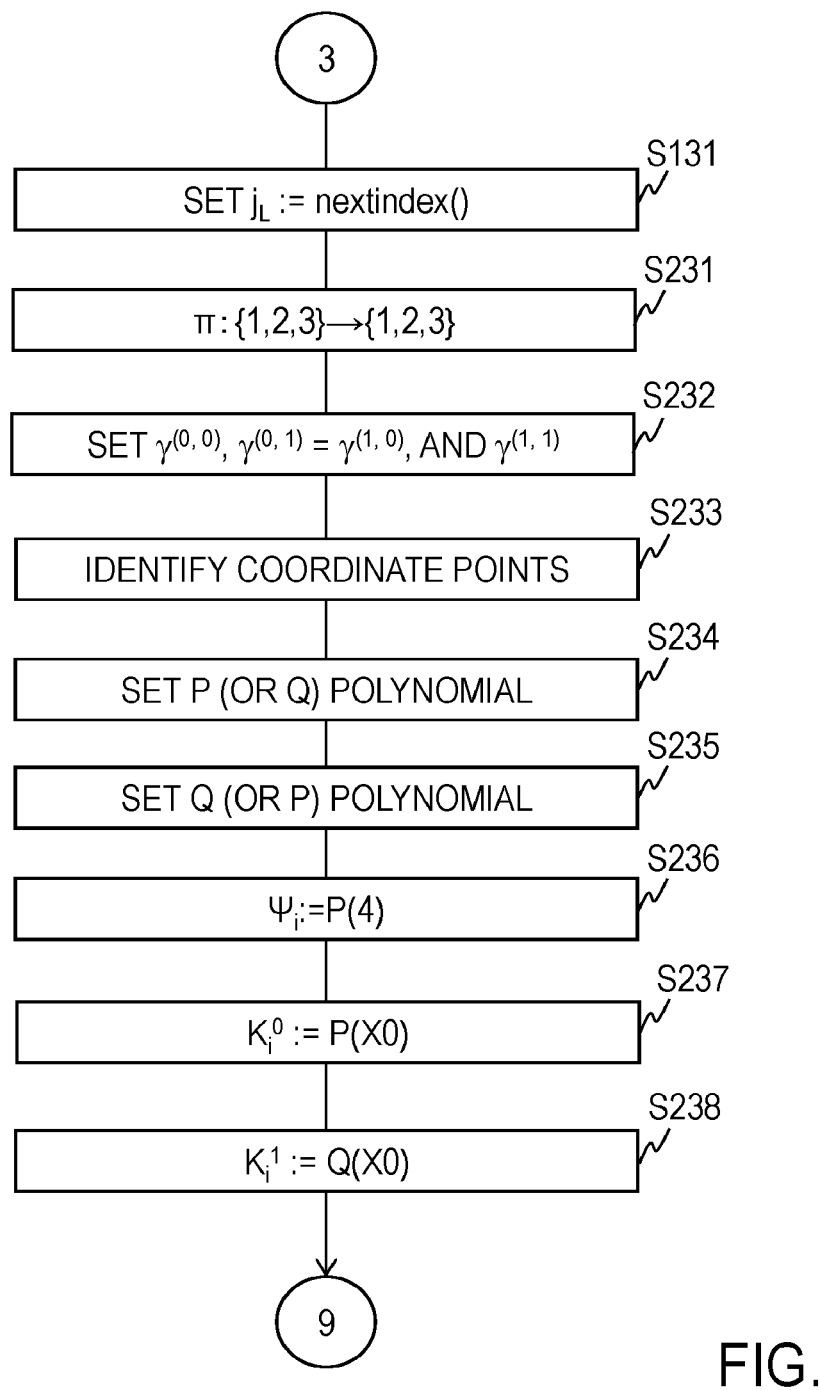
FIG. 17 is a flowchart for explaining circuit concealment processing of the embodiment.

As illustrated in FIG. 16, the calculation apparatus 23 includes a communication unit 1311, a storage 132, a controller 133, a separator 134, an input wire setter 1351, a label calculation unit 1352, a separator 1353, a determiner 1354, a setter 1355, a key decoder 1356, a setter 1357, a decoder 2358, an output key generator 2359, an output value generator 136, and a coordinate point identifier 2357.

Each of the circuit concealing apparatus 21, the coding apparatus 12, the calculation apparatus 23, and the decoding apparatus 14 is an apparatus configured as a result of, for example, the above-mentioned computer executing a predetermined program. The circuit concealing apparatus 21, the coding apparatus 12, the calculation apparatus 23, and the decoding apparatus 14 perform processing under control of the controllers 113, 123, 133, and 143, respectively. Information input to the circuit concealing apparatus 21, the coding apparatus 12, the calculation apparatus 23, and the decoding apparatus 14 and data obtained in these apparatuses are stored respectively in the storages 112, 122, 132, and 142 one by one and used by being read therefrom when necessary.

<Circuit Concealment Processing of the Circuit Concealing Apparatus 21>

Concealment processing which is performed on the circuit f=(n, m, u, A, B, g) by the circuit concealing apparatus 21 will be described by using FIGS. 6 to 8 and FIGS. 17 and 18.

In the present embodiment, in place of the circuit concealing apparatus 11, the circuit concealing apparatus 21 executes processing in Step S101 to S130 described in the first embodiment. Then, in place of the circuit concealing apparatus 11, the circuit concealing apparatus 21 executes processing in Steps S131 and S231 to S238 of FIG. 17 in place of Steps S131 to S136.

In Steps S131 and S231 to S238, an output key $K_i^{g(I(A), I(B))}$ corresponding to an output value $g_i(I(A), I(B)) \in \{0, 1\}$ is set by using input keys $K_A^0, K_A^1, K_B^0$, and $K_B^1$, and, furthermore, $\gamma^{(0, 0)}, \gamma^{(0, 1)} = \gamma^{(1, 0)}$, and $\gamma^{(1, 1)}$ are obtained. Processing in Steps S131 and S231 to S238 differs depending on the type of the gate G(i). Hereinafter, processing in Steps S131 and S231 to S238 when the gate G(i) is the AND gate, when the gate G(i) is the OR gate, and when the gate G(i) is the XOR gate will be described.

<<When the Gate G(i) is the AND Gate>>

In Step S131, the setter 1181 (FIG. 15) increments the internal counter by 1 by nextindex( ) and outputs the value of the internal counter after increment as $j_L$ (Step S131).

$$j_L := \text{nextindex}(\ )$$

The setter 2181 sets a random permutation function $\pi: \{1, 2, 3\} \to \{1, 2, 3\}$ that randomly permutates the member sequence of $\{1, 2, 3\}$(Step S231), obtains $\pi(\varepsilon) \in \{1, 2, 3\}$ by applying this random permutation function $\pi$ to $\varepsilon \in \{1, 2, 3\}$, and makes settings so that $\gamma^{(0, 0)} := \pi(1) \in \{0, 1\}^2$, $\gamma^{(0, 1)} := \gamma^{(1, 0)} := \pi(2) \in \{0, 1\}^2$, and $\gamma^{(1, 1)} := \pi(3) \in \{0, 1\}^2$. $\gamma^{(0, 0)}$ is a value corresponding to $(I(A), I(B)) = (0, 0)$, $\gamma^{(0, 1)}$ is a value corresponding to $(I(A), I(B)) = (0, 1)$, $\gamma^{(1, 0)}$ is a value corresponding to $(I(A), I(B)) = (1, 0)$, and $\gamma^{(1, 1)}$ is a value corresponding to $(I(A), I(B)) = (1, 1)$. Here, $\pi(1) \neq \pi(2)$, $\pi(2) \neq \pi(3)$, and $\pi(1) \neq \pi(3)$ (Step S232).

The coordinate point identifier 2187 obtains, by using $\gamma^{(0, 0)}, \gamma^{(0, 1)}, =\gamma^{(1, 0)}, \gamma^{(1, 1)}, K_A^0, K_B^0, d_i$, and $j_L$ as input, a point $(X1, Y1) := (\gamma^{(0, 0)}, H(K_A^0 + K_B^0, j_L))$, a point $(X2, Y2) := (\gamma^{(1, 0)}, H(K_A^1 + K_B^0 + d_i, j_L)) = (\gamma^{(0, 1)}, H(K_A^0 + K_B^0 + d_i, j_L))$, and a point $(X3, Y3) := (\gamma^{(1, 1)}, H(K_A^0 + K_B^0 + 2d_i, j_L))$ and outputs the point (X1, Y1), the point (X2, Y2), and the point (X3, Y3). X1 is the function value of the value $\gamma^{(0, 0)}$, Y1 is the function value of a value including $K_A^0 + K_B^0$, X2 is the function value of the value $\gamma^{(1, 0)} = \gamma^{(0, 1)}$, Y2 is the function value of a value including $K_A^0 + K_B^0 + d_i$, X3 is the function value of the value $\gamma^{(1, 1)}$, and Y3 is the function value of a value including $K_A^0 + K_B^0 + 2d_i$(Step S233).

Figure 20A:
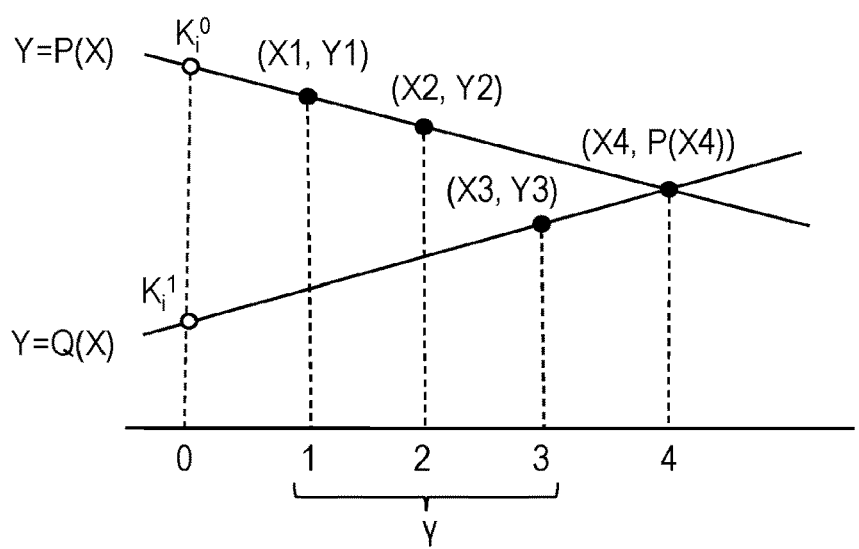
FIGS. 20A to 20C are diagrams for explaining a concealed circuit of the embodiment.

The P polynomial setter 2183 obtains, by using the point (X1, Y1) and the point (X2, Y2) as input, a first-degree polynomial Y=P(X) passing through the point (X1, Y1) and the point (X2, Y2) and outputs the first-degree polynomial Y=P(X). X is a value on the x-axis and Y is a value on the y-axis. In FIG. 20A, the relationship among (X1, Y1), (X2, Y2), and Y=P(X) when $\pi(1)=1$, $\pi(2)=2$, and $\pi(3)=3$ is illustrated (Step S234).

The Q polynomial setter 2186 obtains, by using the first-degree polynomial Y=P(X) as input, a point (X4, P(X4)) by substituting a constant X4 (for example, X4=4), which is different from X1 to X3, into Y=P(X). The Q polynomial setter 2186 further obtains, by using the point (X3, Y3) as input, a first-degree polynomial Y=Q(X) passing through the point (X3, Y3) and the point (X4, P(X4)) and outputs the first-degree polynomial Y=Q(X). In FIG. 20A, the relationship among (X3, Y3), (X4, P(X4)), and Y=Q(X) when $\pi(1)=1$, $\pi(2)=2$, $\pi(3)=3$, and X4=4 is illustrated (Step S235).

The $\Psi$ setter 2182 sets $\Psi_i := P(X4)$ by using $P(X4) = Q(X4)$ as input and outputs $\Psi_i$ (Step S236).

$$\Psi_i := P(X4)$$

The output key setter 2184 outputs, as an output key $K_i^0 := P(X0)$, P(X0) obtained by substituting a constant X0 (for example, X0=0), which is different from X1 to X4, into Y=P(X) by using the first-degree polynomial Y=P(X) as input. In FIG. 20A, the relationship between Y=P(X) and $K_i^0$ when $\pi(1)=1$, $\pi(2)=2$, $\pi(3)=3$, and X0=0 is illustrated (Step S237).

$$K_i^0 := P(X0)$$

The output key setter 2185 outputs, as an output key $K_i^1 := Q(X0)$, Q(X0) obtained by substituting the above-described constant X0 into Y=Q(X) by using the first-degree polynomial Y=Q(X) as input. In FIG. 20A, the relationship between Y=Q(X) and $K_i^1$ when $\pi(1)=1$, $\pi(2)=2$, $\pi(3)=3$, and X0=0 is illustrated (Step S238).

<<When the Gate G(i) is the OR Gate>>

Figure 20B:
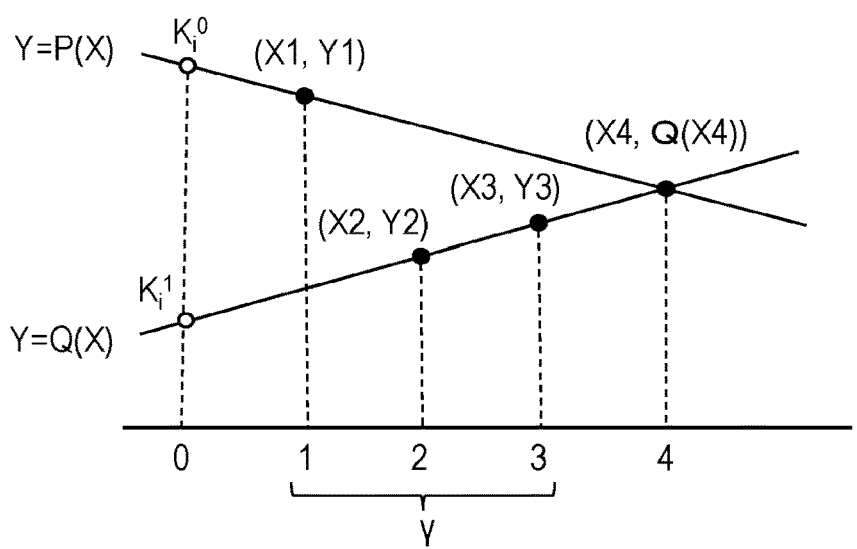

The processing in Steps S131 and S231 to S233 is the same as the processing performed when the gate G(i) is the AND gate. After Step S233, the Q polynomial setter 2186 obtains, by using the point (X2, Y2) and the point (X3, Y3) as input, a first-degree polynomial Y=Q(X) passing through the point (X2, Y2) and the point (X3, Y3) and outputs the first-degree polynomial Y=Q(X). In FIG. 20B, the relationship among (X2, Y2), (X3, Y3), and Y=Q(X) when $\pi(1)=1$, $\pi(2)=2$, and $\pi(3)=3$ is illustrated (Step S234).

The P polynomial setter 2183 obtains, by using the first-degree polynomial Y=Q(X) as input, a point (X4, Q(X4)) by substituting a constant X4 (for example, X4=4), which is different from X1 to X3, into Y=Q(X). The P polynomial setter 2183 further obtains, by using the point (X1, Y1) as input, a first-degree polynomial Y=P(X) passing through the point (X1, Y1) and the point (X4, Q(X4)) and outputs the first-degree polynomial Y=P(X). In FIG. 20B, the relationship among (X1, Y1), (X4, Q(X4)), and Y=P(X) when $\pi(1)=1$, $\pi(2)=2$, $\pi(3)=3$, and X4=4 is illustrated (Step S235).

The $\Psi$ setter 2182 makes settings so that $\Psi_i := Q(X4)$ by using $Q(X4) = P(X4)$ as input and outputs $\Psi_i$ (Step S236).

$$\Psi_i := Q(X4)$$

The output key setter 2184 outputs, as an output key $K_i^0 := P(X0)$, P(X0) obtained by substituting a constant X0 (for example, X0=0), which is different from X1 to X4, into Y=P(X) by using the first-degree polynomial Y=P(X) as input. In FIG. 20B, the relationship between Y=P(X) and $K_i^0$ when $\pi(1)=1$, $\pi(2)=2$, $\pi(3)=3$, and X0=0 is illustrated (Step S237).

$$K_i^0 := P(X0)$$

The output key setter 2185 outputs, as an output key $K_i^1 := Q(X0)$, Q(X0) obtained by substituting the above-described constant X0 into Y=Q(X) by using the first-degree polynomial Y=Q(X) as input. In FIG. 20B, the relationship between Y=Q(X) and $K_i^1$ when $\pi(1)=1$, $\pi(2)=2$, $\pi(3)=3$, and X0=0 is illustrated (Step S238).

<<When the Gate G(i) is the XOR Gate>>

Figure 20C:
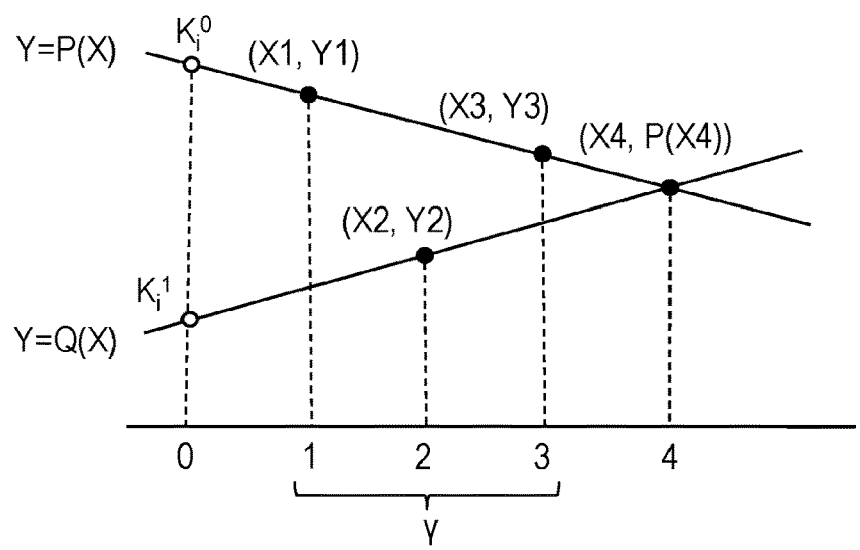

The processing in Steps S131 and S231 to S233 is the same as the processing performed when the gate G(i) is the AND gate. After Step S233, the P polynomial setter 2183 obtains, by using the point (X1, Y1) and the point (X3, Y3) as input, a first-degree polynomial Y=P(X) passing through the point (X1, Y1) and the point (X3, Y3) and outputs the first-degree polynomial Y=P(X). In FIG. 20C, the relationship among (X1, Y1), (X3, Y3), and Y=P(X) when $\pi(1)=1$, $\pi(2)=2$, and $\pi(3)=3$ is illustrated (Step S234).

The Q polynomial setter 2186 obtains, by using the first-degree polynomial Y=P(X) as input, a point (X4, P(X4)) by substituting a constant X4 (for example, X4=4), which is different from X1 to X3, into Y=P(X). The Q polynomial setter 2186 further obtains, by using the point (X2, Y2) as input, a first-degree polynomial Y=Q(X) passing through the point (X2, Y2) and the point (X4, P(X4)) and outputs the first-degree polynomial Y=Q(X). In FIG. 20C, the relationship among (X2, Y2), (X4, P(X4)), and Y=Q(X) when $\pi(1)=1$, $\pi(2)=2$, $\pi(3)=3$, and X4=4 is illustrated (Step S235).

The $\Psi$ setter 2182 makes settings so that $\Psi_i:=P(X4)$ by using P(X4)=Q(X4) as input and outputs $\Psi_i$ (Step S236).

$$\Psi_i:=P(X4)$$

The output key setter 2184 outputs, as an output key $K_i^0:=P(X0)$, P(X0) obtained by substituting a constant X0 (for example, X0=0), which is different from X1 to X4, into Y=P(X) by using the first-degree polynomial Y=P(X) as input. In FIG. 20C, the relationship between Y=P(X) and $K_i^0$ when $\pi(1)=1$, $\pi(2)=2$, $\pi(3)=3$, and X0=0 is illustrated (Step S237).

$$K_i^0:=P(X0)$$

The output key setter 2185 outputs, as an output key $K_i^1:=Q(X0)$, Q(X0) obtained by substituting the above-described constant X0 into Y=Q(X) by using the first-degree polynomial Y=Q(X) as input. In FIG. 20C, the relationship between Y=Q(X) and $K_i^1$ when $\pi(1)=1$, $\pi(2)=2$, $\pi(3)=3$, and X0=0 is illustrated (Step S238).

Figure 18:
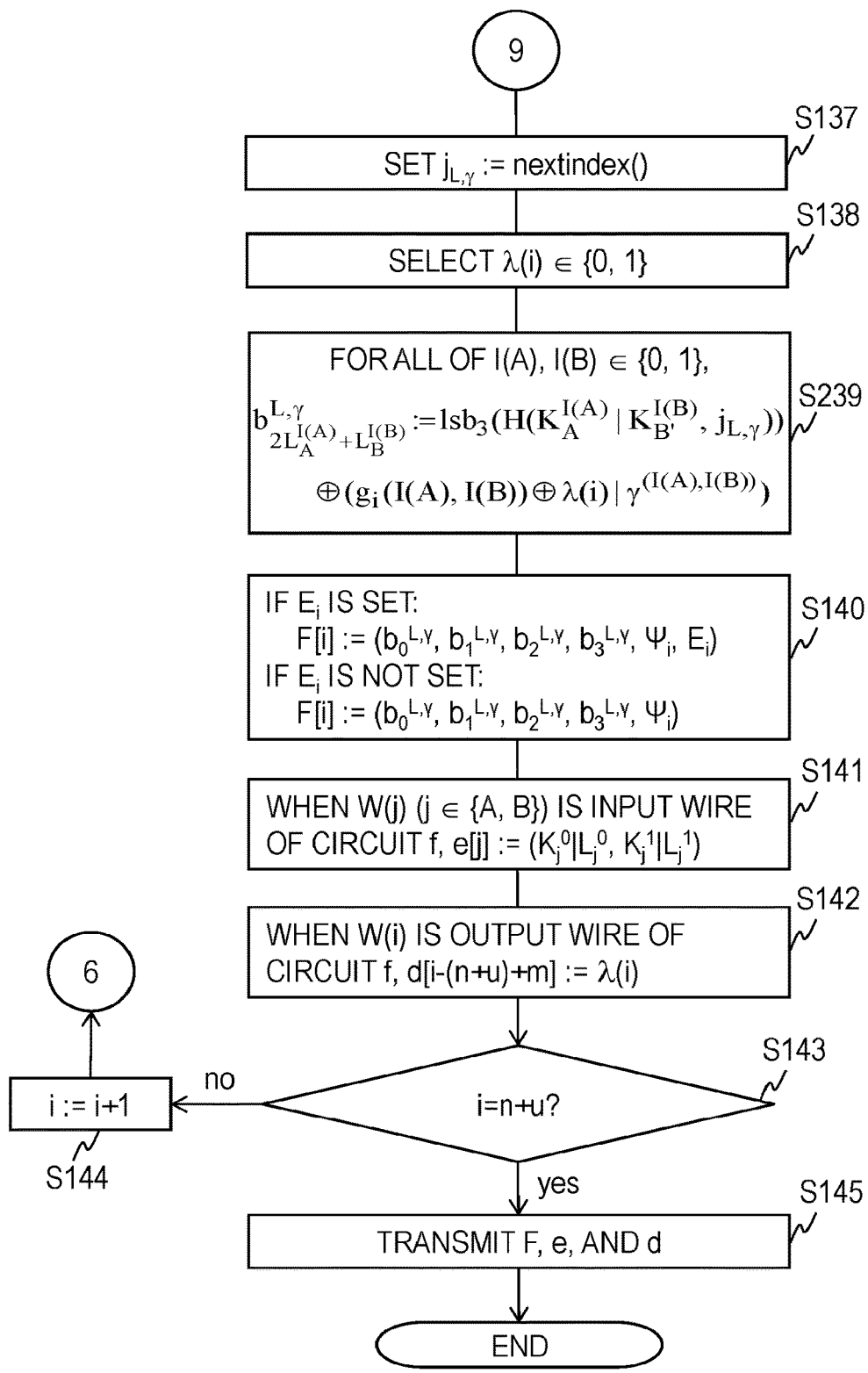
FIG. 18 is a flowchart for explaining the circuit concealment processing of the embodiment.

After Steps S131 and S231 to S238, in place of the circuit concealing apparatus 11, the circuit concealing apparatus 21 performs the processing in Steps S137 and S138 described in the first embodiment (FIG. 18). Then, for all of I(A), I(B)∈{0, 1}, by using $K_A^{I(A)}$, $K_{B'}^{I(B)}$, $j_{L,\gamma}$, $\lambda(i)$, and $\gamma^{(I(A), I(B))}$ as input, the encryptor 2193 (the output label setter) obtains and outputs $$b^{L,\gamma}_{2L_A^{I(A)}+L_B^{I(B)}}:=$$

$$lsb_3(H(K_A^{I(A)} | K_{B'}^{I(B)}, j_{L,\gamma})) \oplus (g_i(I(A), I(B)) \oplus \lambda(i) | Y^{(I(A),I(B))})$$

where $lsb_3(\alpha)$ represents 3 bits from the least significant bit to the third bit of the bit string $bit_\alpha \in \{0, 1\}^k$ which is obtained by expressing $\alpha \in F_q$ in k bits.

$$b^{L,\gamma}_{2L_A^{I(A)}+L_B^{I(B)}}$$

is cipher text obtained by encrypting the label $L_i^{g(I(A), I(B))}=g_i(I(A), I(B))(xor)\lambda(i)$ set for the output value $g_i(I(A), I(B))$ and $\gamma^{(I(A), I(B))}$ by using, as a symmetric key, the function value $$lsb_3(H(K_A^{I(A)}|K_B^{I(B)}j_{L,\gamma}))$$

of a value including the input keys $K_A^{I(A)}$ and $K_{B'}^{I(B)}$ (Step S239).

Then, in place of the circuit concealing apparatus 11, the circuit concealing apparatus 21 performs the processing from Steps S140 to S143 described in the first embodiment. If a determination is made in Step S143 that i=n+u does not hold, the controller 113 sets i+1 as new i (i:=i+1) (Step S144) and returns the processing to Step S103. On the other hand, if i=n+u holds, the communication unit 1111 transmits the concealed circuit F made up of all the concealed gates F[i] thus obtained, the coding information e made up of all the coding information e[j] thus obtained, and the decoding information d made up of all the decoding information d[i−(n+u)+m] thus obtained. The concealed circuit F is transmitted to the calculation apparatus 13 along with m, the coding information e is transmitted to the coding apparatus 12, and the decoding information d is transmitted to the decoding apparatus 14 (Step S145).

<Coding Processing of the Coding Apparatus 12>

The coding processing of the coding apparatus 12 is the same as that of the first embodiment.

<Calculation Processing of the Calculation Apparatus 23>

Figure 19:
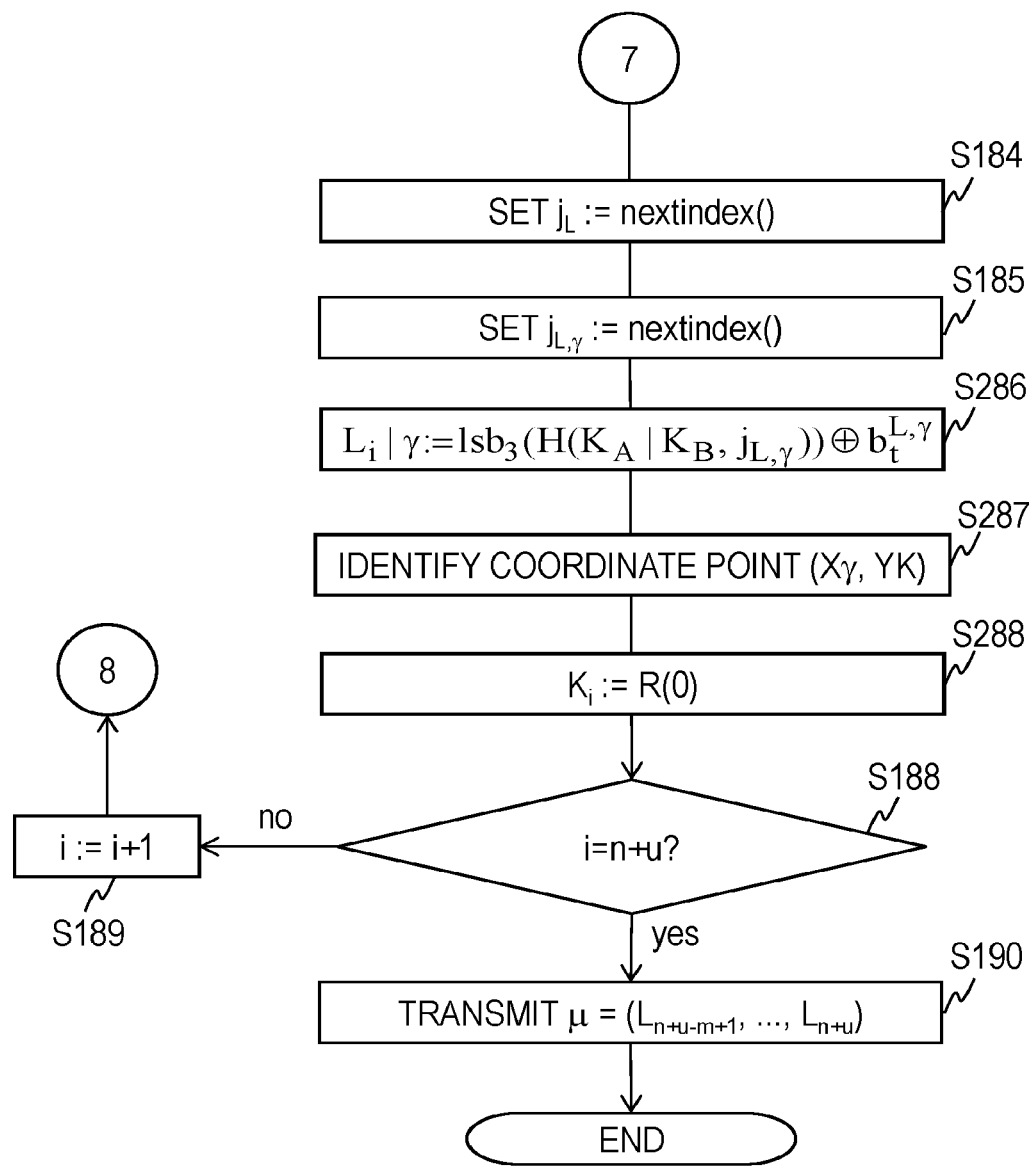
FIG. 19 is a flowchart for explaining concealed circuit calculation processing of the embodiment.

The calculation processing of the calculation apparatus 23 will be described by using FIGS. 12 and 19.

In the present embodiment, in place of the calculation apparatus 13, the calculation apparatus 23 executes the processing in Steps S171 to S185 described in the first embodiment. Next, the decoder 2358 obtains, by using $K_A$, $K_B$, $j_{L,\gamma}$, and $b_t^{L,\gamma}$ of $b_0^{L,\gamma}$, $b_1^{L,\gamma}$, $b_2^{L,\gamma}$, and $b_3^{L,\gamma}$ obtained in Step S179, which corresponds to t∈{0, 1, 2, 3} obtained in Step S178, as input, an XOR of $lsb_3(H(K_A|K_B), j_{L,\gamma})$ and $b_t^{L,\gamma}$ as $L_i|\gamma$ and outputs $L_i|\gamma$. That is, the decoder 2358 obtains $L_i$ and $\gamma = \gamma^{(I(A), I(B))}$ by decoding the cipher text $b_t^{L,\gamma}$ by using, as a symmetric key, the function value $(lsb_3(H(K_A|K_B), j_{L,\gamma}))$ of a value including $K_A$ and $K_B$ corresponding to the input value of the gate G(i) (Step S286).

$$L_i|\gamma:=lsb_3(H(K_A|K_B j_{L,\gamma})) \oplus b_t^{L,\gamma}$$

The coordinate point identifier 2357 obtains a point $(X\gamma, YK)=(\gamma, H(K_A+K_B), j_L))$ by using the input keys $K_A=K_A^{I(A)}$, $K_B=K_{B'}^{I(B)} \in \{0, 1\}$ corresponding to the input values (I(A), I(B)), the value $\gamma = \gamma^{(I(A), I(B))}$, and $j_L$ as input and outputs the point $(X\gamma, YK)$. That is, the coordinate point identifier 2357 obtains the point $(X\gamma, YK)$ by setting the function value of the value $\gamma = \gamma^{(I(A), I(B))}$ as $X\gamma$ and the function value of a value including $K_A+K_B$ as YK and outputs the point $(X\gamma, YK)$ (Step S287).

The output key generator 2359 obtains, as an output key $K_i$, a value Y=R(X0) obtained by substituting a constant X0 (for example, X0=0) into a first-degree polynomial Y=R(X) passing through the point $(X\gamma, YK)$ and the point $(X4, \Psi_i)$ by using $\Psi_i=P(X4)=Q(X4)$ obtained in Step S179 and the point $(X\gamma, YK)$ obtained in Step S287 as input and outputs the output key $K_i$. As mentioned earlier, X4 (for example, X4=4) is a constant (Step S288).

The controller 133 determines whether i=n+u (Step S188). If i=n+u does not hold, the controller 133 sets i+1 as new i (i:=i+1) (Step S189) and returns the processing to Step S177. On the other hand, if i=n+u, the output value generator 136 obtains a label sequence $\mu=(L_{n+u-m+1}, \ldots, L_{n+u})$ by using the label $L_i$ (where i∈{n+1, . . . , n+u}) obtained in Step S186 and m as input, and the communication unit 1311 transmits the label sequence µ to the decoding apparatus 14 (Step S190).

$$\mu:=(L_{n+u-m+1}, \ldots, L_{n+u})$$

<Coding Processing of the Decoding Apparatus 14>

The coding processing of the decoding apparatus 14 is the same as that of the first embodiment.

Features of the Present Embodiment

Also in the present embodiment, in the circuit concealment processing, for each gate G(i), at least any one of the input keys $K_A^0$, $K_A^1$, $K_B^0$, and $K_B^1$ is set so that the input keys $K_A^0$, $K_A^1$, $K_B^0$, and $K_B^1$ which satisfy $K_A^1-K_A^0=K_{B'}^1-K_{B'}^0=d_i$ are obtained, and the output key $K_i^{g(I(A), I(B))}$ corresponding to the output value $g_i(I(A), I(B))$ is set by using the input keys $K_A^0$, $K_A^1$, $K_{B'}^0$ and $K_{B'}^1$ (Steps S110 to S130). As a result, compared to the existing system that independently generates all the input keys $K_A^0$, $K_A^1$, $K_B^0$, and $K_B^1$, it is possible to reduce the amount of data of the concealed circuit F.

OTHER MODIFICATIONS AND SO FORTH

It is to be noted that the present invention is not limited to the above-described embodiments. For instance, as long as the circuit concealing apparatus and the coding apparatus are different apparatuses, more than one apparatus of the circuit concealing apparatus, the coding apparatus, the calculation apparatus, and the decoding apparatus may be configured as one apparatus. Moreover, in the above-described embodiments, as a method of encrypting β by using α as a symmetric key (for example, Step S115), an example in which an XOR of α and β is calculated is described. Alternatively, β may be encrypted by using α as a symmetric key in accordance with a symmetric key cryptosystem such as AES or Camellia (a registered trademark). Furthermore, the "function value of a value including α" may be α itself, the function value of α, or the function value of a value including α and other information. For example, in place of $H(K_B^{1(xor)\lambda(B)}, j_E)$ in Step S115, $K_B^{1(xor)\lambda(B)}$ itself may be used or $H(K_B^{1(xor)\lambda(B)})$ may be used. Moreover, as the "function value", an injective function value (such as cipher text) other than a hash value may be used.

The above-described various kinds of processing may be executed, in addition to being executed in chronological order in accordance with the descriptions, in parallel or individually depending on the processing power of an apparatus that executes the processing or when needed. In addition, it goes without saying that changes may be made as appropriate without departing from the spirit of the present invention.

When the above-described configurations are implemented by a computer, the processing details of the functions supposed to be provided in each apparatus are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording apparatus, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage apparatus of a server computer and transferring the program to other computers from the server computer via a network.

The computer that executes such a program first, for example, temporarily stores the program recorded on the portable recording medium or the program transferred from the server computer in a storage apparatus thereof. At the time of execution of processing, the computer reads the program stored in the storage apparatus thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

In the above-described embodiments, processing functions of the present apparatus are implemented as a result of a predetermined program being executed on the computer, but at least part of these processing functions may be implemented by hardware.

DESCRIPTION OF REFERENCE NUMERALS

1, 2 secure computation system
11, 21 circuit concealing apparatus
12 coding apparatus
13, 23 calculation apparatus
14 decoding apparatus

What is claimed is:

1. A circuit concealing apparatus, configured to be implemented in a system that further includes a coding apparatus configured to receive an n-bit input value x, a calculation apparatus, and a decoding apparatus configured to output a function f(x), the circuit concealing apparatus, the coding apparatus, the calculation apparatus, and the decoding apparatus transmit and receive information via a network, the circuit concealing apparatus being configured to conceal a circuit including u gates G(n+1), . . . , G(n+u) performing logical operation, and the circuit concealing apparatus is configured to transmit the concealed circuit to the calculation apparatus such that the calculation apparatus is configured to generate a label sequence based on the concealed circuit and a code generated by the coding apparatus based on the input value x, and the decoding apparatus is configured to calculate f(x) based on at least the label sequence received from the calculation apparatus, wherein the circuit is concealed from the coding apparatus, the calculation apparatus, and the decoding apparatus, wherein $i \in \{n+1, \ldots, n+u\}$, u represents a number of the gates $G(n+1), \ldots, G(n+u)$, u is an integer greater than or equal to 1, and n is an even number greater than or equal to 2, input values of a gate G(i) that performs a logical operation are $I(A), I(B) \in \{0, 1\}$ and an output value of the gate G(i) is $g_i(I(A), I(B)) \in \{0, 1\}$, an input key corresponding to the input value I(A) is $K_A^{I(A)} \in F_q$, an input key corresponding to the input value I(B) is $K_{B'}^{I(B)} \in F_q$, and $F_q$ represents a finite field of order q, and q is a positive integer, α(xor)β is an XOR of α and β, $\lambda(A), \lambda(B), \lambda(i) \in \{0, 1\}$ are permutation bits each of which is selected randomly, and the circuit concealing apparatus includes processing circuitry configured to implement:

an input key setter that sets at least any one of the input keys $K_A^0, K_A^1, K_{B'}^0$, and $K_{B'}^1$ so that the input keys $K_A^0, K_A^1, K_{B'}^0$, and $K_{B'}^1$ which satisfy $K_A^1 - K_A^0 = K_{B'}^1 - K_{B'}^0 = d_i \in F_q$ are obtained, an output key setter that sets an output key $K_i^{g_i(I(A), I(B))}$ corresponding to the output value $g_i(I(A), I(B))$ by using the input keys $K_A^0, K_A^1, K_{B'}^0$, and $K_{B'}^1$, an input label setter that sets, when a label $L_A^{I(A)}$ corresponding to the input value I(A) is not set, the label $L_A^{I(A)} = \lambda(A)(xor)I(A)$ and sets, when a label $L_B^{I(B)}$ corresponding to the input value I(B) is not set, the label $L_B^{I(B)} = \lambda(B)(xor)I(B)$, and an output label setter that obtains cipher text obtained by encrypting a label $L_i^{g(I(A), I(B))} = \lambda(i)(xor)g_i(I(A), I(B))$ set for the output value $g_i(I(A), I(B))$ by using a symmetric key which is a function value of a value including the input keys $K_A^{I(A)}$ and $K_B^{I(B)}$.

2. The circuit concealing apparatus according to claim 1, wherein $\alpha(xor)\beta$ is an XOR of $\alpha$ and $\beta$ and $\lambda(B) \in \{0, 1\}$ is a permutation bit, and when the input key $K_A^{I(A)}$ corresponding to the input value I(A) is set and the input key $K_B^{I(B)}$ corresponding to the input value I(B) is set, the input key setter obtains $d_i = K_A^1 - K_A^0$, obtains $K_{B'}^{\lambda(B)} = K_B^{\lambda(B)}$ for a label $L_B^{I(B)} = \lambda(B)(xor)I(B)$ corresponding to the input value I(B), obtains $K_{B'}^{1(xor)\lambda(B)} = K_B^{\lambda(B)} + (-1)^{\lambda(B)} d_i$, and obtains cipher text $E_i$ obtained by encrypting $K_{B'}^{1(xor)\lambda(B)}$ by using a function value of a value including the input key $K_B^{1(xor)\lambda(B)}$ as a symmetric key.

3. The circuit concealing apparatus according to claim 2, wherein when the input key $K_A^{I(A)}$ corresponding to the input value I(A) is set and the input key $K_B^{I(B)}$ corresponding to the input value I(B) is not set, the input key setter obtains $d_i = K_A^1 - K_A^0$ and obtains the input key $K_{B'}^1$ and the input key $K_{B'}^0$ which satisfy $K_{B'}^1 = K_{B'}^0 + d_i$, and when the input key $K_A^{i(A)}$ and the input key $K_B^{I(B)}$ are not set, the input key setter randomly selects $d_i$ and obtains the input key $K_A^1$ and the input key $K_A^0$ which satisfy $K_A^1 = K_A^0 + d_i$ and the input key $K_B^1$ and the input key $K_{B'}^0$ which satisfy $K_{B'}^0 = K_{B'}^0 + d_i$.

4. The circuit concealing apparatus according to any one of claims 1 to 3, wherein the output value $g_i(1, 0)$ and the output value $g_i(0, 1)$ are equal.

5. The circuit concealing apparatus according to any one of claims 1 to 3, wherein $\alpha(xor)\beta$ is an XOR of $\alpha$ and $\beta$, and the output key setter obtains an XOR $\Psi_i$ which is a value obtained by XOR of a function value of a value including $K_A^0 + K_B^0$ and a function value of a value including $K_A^0 + K_B^0 + d_i$, selects arbitrary values $b_0, b_1 \in \{0, 1\}$, obtains the output key $K_i^0$ which is a function value of a value including $K_A^0 + K_B^0 + b_0 d_i$, obtains the output key $K_i^1$ which is a value obtained by XOR of a function value of a value including $K_A^0 + K_B^0 + 2d^i$ and $b_1 \Psi_i$, and obtains $\gamma^{(0, 0)} = b_0$, $\gamma^{(0, 1)} = \gamma^{(1, 0)} = 1(xor)b_0$, and $\gamma^{(1, 1)} = b_1$.

6. The circuit concealing apparatus according to any one of claims 1 to 3, wherein $\alpha(xor)\beta$ is an XOR of $\alpha$ and $\beta$, and the output key setter obtains an XOR $\Psi_i$ which is a value obtained by XOR of a function value of a value including $K_A^0 + K_B^0 + d_i$ and a function value of a value including $K_A^0 + K_B^0 + 2d_i$, selects arbitrary values $b_0, b_1 \in \{0, 1\}$, obtains the output key $K_i^0$ which is a value obtained by XOR of a function value of a value including $K_A^0 + K_B^0$ and $b_1 \Psi_i$, obtains the output key $K_i^1$ which is a function value of a value including $K_A^0 + K_B^0 + d_i + b_0 d_i$, and obtains $\gamma^{(0, 0)} = b_1$, $\gamma^{(0, 1)} = \gamma^{(1, 0)} = b_0$, and $\gamma^{(1, 1)} = 1(xor)b_0$.

7. The circuit concealing apparatus according to any one of claims 1 to 3, wherein $\alpha(xor)\beta$ is an XOR of $\alpha$ and $\beta$, and the output key setter obtains an XOR $\Psi_i$ which is a value obtained by XOR of a function value of a value including $K_A^0 + K_B^0$ and a function value of a value including $K_A^0 + K_B^0 + 2d_i$, selects arbitrary values $b_0,$ $b_1 \in \{0, 1\}$, obtains the output key $K_i^0$ which is a function value of a value including $K_A^0 + K_B^0 + 2b_0 d_i$, obtains the output key $K_i^1$ which is a value obtained by XOR of a function value of a value including $K_A^0 + K_B^0 + d_i$ and $b_1 \Psi_i$, and obtains $\gamma^{(0, 0)} = b_0$, $\gamma^{(0, 1)} = \gamma^{(1, 0)} = b_1$, and $\gamma^{(1, 1)} = 1(xor)b_0$.

8. The circuit concealing apparatus according to claim 5, wherein the circuit concealing apparatus obtains cipher text obtained by encrypting $\gamma^{(I(A), I(B))}$ by using, as a symmetric key, a function value of a value including the input keys $K_A^{I(A)}$ and $K_B^{I(B)}$.

9. The circuit concealing apparatus according to claim 6, wherein the circuit concealing apparatus obtains cipher text obtained by encrypting $\gamma^{(I(A), I(B))}$ by using, as a symmetric key, a function value of a value including the input keys $K_A^{I(A)}$ and $K_B^{I(B)}$.

10. The circuit concealing apparatus according to claim 7, wherein the circuit concealing apparatus obtains cipher text obtained by encrypting $\gamma^{(I(A), I(B))}$ by using, as a symmetric key, a function value of a value including the input keys $K_A^{I(A)}$ and $K_B^{I(B)}$.

11. A calculation apparatus comprising processing circuitry configured to implement:

a storage that stores the XOR $\Psi_i$ of claim 5;

a decoder that obtains $\gamma$ by decoding a cipher text by using, as a symmetric key, a function value of a value including input keys $K_A$ and $K_B$ corresponding to input values of a gate that performs a logical operation, wherein the cipher text being obtained by encrypting $\gamma^{(I(A), I(B))}$ by using, as a symmetric key, a function value of a value including the input keys $K_A^{I(A)}$ and $K_B^{I(B)}$; and an output key setter that obtains an XOR of a function value of a value including $K_A + K_B$ and $\gamma \Psi_i$ as an output key $K_i$ corresponding to an output value of the gate.

12. A calculation apparatus comprising processing circuitry configured to implement:

a storage that stores the XOR $\Psi_i$ of claim 6;

a decoder that obtains $\gamma$ by decoding a cipher text by using, as a symmetric key, a function value of a value including input keys $K_A$ and $K_B$ corresponding to input values of a gate that performs a logical operation, wherein the cipher text being obtained by encrypting $\gamma^{(I(A), I(B))}$ by using, as a symmetric key, a function value of a value including the input keys $K_A^{I(A)}$ and $K_B^{I(B)}$; and an output key setter that obtains an XOR of a function value of a value including $K_A + K_B$ and $\gamma \Psi_i$ as an output key $K_i$ corresponding to an output value of the gate.

13. A calculation apparatus comprising processing circuitry configured to implement:

a storage that stores the XOR $\Psi_i$ of claim 7;

a decoder that obtains $\gamma$ by decoding a cipher text by using, as a symmetric key, a function value of a value including input keys $K_A$ and $K_B$ corresponding to input values of a gate that performs a logical operation, wherein the cipher text being obtained by encrypting $\gamma^{(I(A), I(B))}$ by using, as a symmetric key, a function value of a value including the input keys $K_A^{I(A)}$ and $K_B^{I(B)}$; and an output key setter that obtains an XOR of a function value of a value including $K_A + K_B$ and $\gamma \Psi_i$ as an output key $K_i$ corresponding to an output value of the gate.

14. The calculation apparatus according to claim 11, comprising processing circuitry configured to implement:
a key decoder that obtains a new input key $K_B$ by decoding a cipher text $E_i$ by using, as a symmetric key, a function value of a value including an input key $K_B$.

15. The calculation apparatus according to claim 12, comprising processing circuitry configured to implement:
a key decoder that obtains a new input key $K_B$ by decoding a cipher text $E_i$ by using, as a symmetric key, a function value of a value including an input key $K_B$.

16. The calculation apparatus according to claim 13, comprising processing circuitry configured to implement:
a key decoder that obtains a new input key $K_B$ by decoding a cipher text $E_i$ by using, as a symmetric key, a function value of a value including an input key $K_B$.

17. A non-transitory computer-readable recording medium storing a program for making a computer function as the circuit concealing apparatus according to claim 1.

18. A non-transitory computer-readable recording medium storing a program for making a computer function as the calculation apparatus according to claim 11.

19. A non-transitory computer-readable recording medium storing a program for making a computer function as the calculation apparatus according to claim 12.

20. A non-transitory computer-readable recording medium storing a program for making a computer function as the calculation apparatus according to claim 13.

21. A circuit concealing apparatus, configured to be implemented in a system that further includes a coding apparatus configured to receive an n-bit input value x, a calculation apparatus, and a decoding apparatus configured to output a function f(x), the circuit concealing apparatus, the coding apparatus, the calculation apparatus, and the decoding apparatus transmit and receive information via a network, the circuit concealing apparatus being configured to conceal a circuit including u gates $G(n+1), \ldots, G(n+u)$ performing logical operation, and the circuit concealing apparatus is configured to transmit the concealed circuit to the calculation apparatus such that the calculation apparatus is configured to generate a label sequence based on the concealed circuit and a code generated by the coding apparatus based on the input value x, and the decoding apparatus is configured to calculate f(x) based on at least the label sequence received from the calculation apparatus, wherein the circuit is concealed from the coding apparatus, the calculation apparatus, and the decoding apparatus, wherein $i \in \{n+1, \ldots, n+u\}$, u represents a number of the gates $G(n+1), \ldots, G(n+u)$, u is an integer greater than or equal to 1, and n is an even number greater than or equal to 2, input values of a gate G(i) that performs a logical operation are I(A), $I(B) \in \{0, 1\}$ and an output value of the gate G(i) is $g_i(I(A), I(B)) \in \{0, 1\}$, an input key corresponding to the input value I(A) is $K_A^{I(A)} \in F_q$, an input key corresponding to the input value I(B) is $K_B^{I(B)} \in F_q$, and $F_q$ represents a finite field of order q, and q is a positive integer, and the circuit concealing apparatus includes processing circuitry configured to implement:
an input key setter that sets at least any one of the input keys $K_A^0$, $K_A^1$, $K_B^0$, and $K_B^1$ so that the input keys $K_A^0$, $K_A^1$, $K_B^0$, and $K_B^1$ which satisfy $K_A^1 - K_A^0 = K_B^1 - K_B^0 = d_i \in F_q$ are obtained, an output key setter that sets an output key $K_i^{g_i(I(A), I(B))}$ corresponding to the output value $g_i(I(A), I(B))$ by using the input keys $K_A^0$, $K_A^1$, $K_B^0$, and $K_B^1$, wherein X1 is a function value of a value $\gamma^{(0, 0)}$ corresponding to (I(A), I(B))=(0, 0) and Y1 is a function value of a value including $K_A^0 + K_B^0$, X2 is a function value of a value $\gamma^{(1, 0)} = \gamma^{(0, 1)}$ corresponding to (I(A), I(B))=(1, 0) and (I(A), I(B))=(0, 1) and Y2 is a function value of a value including $K_A^0 + K_B^0 + d_i$, X3 is a function value of a value $\gamma^{(1, 1)}$ corresponding to (I(A), I(B))=(1, 1) and Y3 is a function value of a value including $K_A^0 + K_B^0 + 2d_i$, X4 is a value different from X1 to X3 and X0 is a value different from X1 to X4, and the output key setter includes
a P polynomial setter that obtains a first-degree polynomial Y=P(X) passing through a point (X1, Y1) and a point (X2, Y2),
a Q polynomial setter that obtains a first-degree polynomial Y=Q(X) passing through a point (X3, Y3) and a point (X4, P(X4)),
a $\Psi$ setter that makes settings so that $\Psi_i = P(X4)$, and
an output key setter that sets P(X0) as the output key $K_i^0$ and sets Q(X0) as the output key $K_i^1$.

22. A calculation apparatus comprising processing circuitry configured to implement:
a storage that stores the $\Psi_i$ of claim 21;
a coordinate point identifier that obtains, by using input keys $K_A = K_A^{I(A)}$ and $K_B = K_B^{I(B)}$ corresponding to input values (I(A), I(B)) of a gate that performs a logical operation and a value $\gamma^{(I(A), I(B))}$ as input, a point (X$\gamma$, YK) by setting a function value of the value $\gamma^{(I(A), I(B))}$ as X$\gamma$ and setting a function value of a value including $K_A + K_B$ as YK; and
an output key setter that obtains, as an output key $K_i$, a value Y=R(X0) obtained by substituting a constant X0 into a first-degree polynomial Y=R(X) passing through the point (X$\gamma$, YK) and the point (X4, $\Psi_i$).

23. The calculation apparatus according to claim 22, comprising processing circuitry configured to implement:
a key decoder that obtains a new input key $K_B$ by decoding a cipher text $E_i$ by using, as a symmetric key, a function value of a value including an input key $K_B$.

24. A non-transitory computer-readable recording medium storing a program for making a computer function as the calculation apparatus according to claim 22.

25. A circuit concealing apparatus, configured to be implemented in a system that further includes a coding apparatus configured to receive an n-bit input value x, a calculation apparatus, and a decoding apparatus configured to output a function f(x), the circuit concealing apparatus, the coding apparatus, the calculation apparatus, and the decoding apparatus transmit and receive information via a network, the circuit concealing apparatus being configured to conceal a circuit including u gates $G(n+1), \ldots, G(n+u)$ performing logical operation, and the circuit concealing apparatus is configured to transmit the concealed circuit to the calculation apparatus such that the calculation apparatus is configured to generate a label sequence based on the concealed circuit and a code generated by the coding apparatus based on the input value x, and the decoding apparatus is configured to calculate f(x) based on at least the label sequence received from the calculation apparatus, wherein the circuit is concealed from the coding apparatus, the calculation apparatus, and the decoding apparatus, wherein i∈{n+1, . . . , n+u}, u represents a number of the gates G(n+1), . . . , G(n+u), u is an integer greater than or equal to 1, and n is an even number greater than or equal to 2, input values of a gate G(i) that performs a logical operation are I(A), I(B)∈{0, 1} and an output value of the gate G(i) is $g_i(I(A), I(B))\in\{0, 1\}$, an input key corresponding to the input value I(A) is $K_A^{I(A)} \in F_q$, an input key corresponding to the input value I(B) is $K_{B'}^{I(B)} \in F_q$, and $F_q$ represents a finite field of order q, and q is a positive integer, and the circuit concealing apparatus includes processing circuitry configured to implement:

an input key setter that sets at least any one of the input keys $K_A^0, K_A^1, K_{B'}^0$, and $K_{B'}^1$ so that the input keys $K_A^0, K_A^1, K_{B'}^0$, and $K_{B'}^1$ which satisfy $K_A^1 - K_A^0 = K_{B'}^1 - K_{B'}^0 = d_i \in F_q$ are obtained, an output key setter that sets an output key $K_i^{g(I(A), I(B))}$ corresponding to the output value $g_i(I(A), I(B))$ by using the input keys $K_A^0, K_A^1, K_{B'}^0$, and $K_{B'}^1$, wherein X1 is a function value of a value corresponding to (I(A), I(B))=(0, 0) and Y1 is a function value of a value including $K_A^0 + K_{B'}^0$, X2 is a function value of a value $\gamma^{(1, 0)} = \gamma^{(0, 1)}$ corresponding to (I(A), I(B))=(1, 0) and (I(A), I(B))=(0, 1) and Y2 is a function value of a value including $K_A^0 + K_{B'}^0 + d_i$, X3 is a function value of a value $\gamma^{(1, 1)}$ corresponding to (I(A), I(B))=(1, 1) and Y3 is a function value of a value including $K_A^0 + K_{B'}^0 + 2d_i$, X4 is a constant different from X1 to X3 and X0 is a constant different from X1 to X4, and the output key setter includes a Q polynomial setter that obtains a first-degree polynomial Y=Q(X) passing through a point (X2, Y2) and a point (X3, Y3), a P polynomial setter that obtains a first-degree polynomial Y=P(X) passing through a point (X1, Y1) and a point (X4, Q(X4)), a Ψ setter that makes settings so that $\Psi_i = Q(X4)$, and an output key setter that sets P(X0) as the output key $K_i^0$ and sets Q(X0) as the output key $K_i^1$.

26. A calculation apparatus comprising processing circuitry configured to implement:

a storage that stores the $\Psi_i$ of claim 25;

a coordinate point identifier that obtains, by using input keys $K_A = K_A^{I(A)}$ and $K_B = K_B^{I(B)}$ corresponding to input values (I(A), I(B)) of a gate that performs a logical operation and a value $\gamma^{(I(A), I(B))}$ as input, a point (Xγ, YK) by setting a function value of the value $\gamma^{(I(A), I(B))}$ as Xγ and setting a function value of a value including $K_A + K_B$ as YK; and an output key setter that obtains, as an output key $K_i$, a value Y=R(X0) obtained by substituting a constant X0 into a first-degree polynomial Y=R(X) passing through the point (Xγ, YK) and the point (X4, $\Psi_i$).

27. The calculation apparatus according to claim 26, comprising processing circuitry configured to implement:

a key decoder that obtains a new input key $K_B$ by decoding a cipher text $E_i$ by using, as a symmetric key, a function value of a value including an input key $K_B$.

28. A non-transitory computer-readable recording medium storing a program for making a computer function as the calculation apparatus according to claim 26.

29. A circuit concealing apparatus, configured to be implemented in a system that further includes a coding apparatus configured to receive an n-bit input value x, a calculation apparatus, and a decoding apparatus configured to output a function f(x), the circuit concealing apparatus, the coding apparatus, the calculation apparatus, and the decoding apparatus transmit and receive information via a network, the circuit concealing apparatus being configured to conceal a circuit including u gates G(n+1), . . . , G(n+u) performing logical operation, and the circuit concealing apparatus is configured to transmit the concealed circuit to the calculation apparatus such that the calculation apparatus is configured to generate a label sequence based on the concealed circuit and a code generated by the coding apparatus based on the input value x, and the decoding apparatus is configured to calculate f(x) based on at least the label sequence received from the calculation apparatus, wherein the circuit is concealed from the coding apparatus, the calculation apparatus, and the decoding apparatus, wherein i∈{n+1, . . . , n+u}, u represents a number of the gates G(n+1), . . . , G(n+u), u is an integer greater than or equal to 1, and n is an even number greater than or equal to 2, input values of a gate G(i) that performs a logical operation are I(A), I(B)∈{0, 1} and an output value of the gate G(i) is $g_i(I(A), I(B))\in\{0, 1\}$, an input key corresponding to the input value I(A) is $K_A^{I(A)} \in F_q$, an input key corresponding to the input value I(B) is $K_{B'}^{I(B)} \in F_q$, and $F_q$ represents a finite field of order q, and q is a positive integer, and the circuit concealing apparatus includes processing circuitry configured to implement:

an input key setter that sets at least any one of the input keys $K_A^0, K_A^1, K_{B'}^0$, and $K_{B'}^1$ so that the input keys $K_A^0, K_A^1, K_{B'}^0$, and $K_{B'}^1$ which satisfy $K_A^1 - K_A^0 = K_{B'}^1 - K_{B'}^0 = d_i \in F_q$ are obtained, an output key setter that sets an output key $K_i^{g(I(A), I(B))}$ corresponding to the output value $g_i(I(A), I(B))$ by using the input keys $K_A^0, K_A^1, K_{B'}^0$, and $K_{B'}^1$, wherein X1 is a function value of a value $\gamma^{(0, 0)}$ corresponding to (I(A), I(B))=(0, 0) and Y1 is a function value of a value including $K_A^0 + K_{B'}^0$, X2 is a function value of a value $\gamma^{(1, 0)} = \gamma^{(0, 1)}$ corresponding to (I(A), I(B))=(1, 0) and (I(A), I(B))=(0, 1) and Y2 is a function value of a value including $K_A^0 + K_{B'}^0 + d_i$, X3 is a function value of a value $\gamma^{(1, 1)}$ corresponding to (I(A), I(B))=(1, 1) and Y3 is a function value of a value including $K_A^0 + K_{B'}^0 + 2d_i$, X4 is a value different from X1 to X3 and X0 is a value different from X1 to X4, and the output key setter includes a P polynomial setter that obtains a first-degree polynomial Y=P(X) passing through a point (X1, Y1) and a point (X3, Y3), a Q polynomial setter that obtains a first-degree polynomial Y=Q(X) passing through a point (X2, Y2) and a point (X4, P(X4)), a Ψ setter that makes settings so that $\Psi_i = P(X4)$, and an output key setter that sets P(X0) as the output key $K_i^0$ and sets Q(X0) as the output key $K_i^1$.

30. A calculation apparatus comprising processing circuitry configured to implement:
- a storage that stores the $\Psi_i$ of claim 29;
- a coordinate point identifier that obtains, by using input keys $K_A=K_A^{I(A)}$ and $K_B=K_B^{I(B)}$ corresponding to input values (I(A), I(B)) of a gate that performs a logical operation and a value $\gamma^{(I(A),\ I(B))}$ as input, a point (X$\gamma$, YK) by setting a function value of the value $\gamma^{(I(A),\ I(B))}$ as X$\gamma$ and setting a function value of a value including $K_A+K_B$ as YK; and
- an output key setter that obtains, as an output key $K_i$, a value Y=R(X0) obtained by substituting a constant X0 into a first-degree polynomial Y=R(X) passing through the point (X$\gamma$, YK) and the point (X4, $\Psi_i$).

31. The calculation apparatus according to claim 30, comprising processing circuitry configured to implement:
- a key decoder that obtains a new input key $K_B$ by decoding a cipher text $E_i$ by using, as a symmetric key, a function value of a value including an input key $K_B$.

32. A non-transitory computer-readable recording medium storing a program for making a computer function as the calculation apparatus according to claim 30.

* * * * *